United States Patent [19]

Inazawa

[11] 4,410,672
[45] Oct. 18, 1983

[54] POLYMERIZATION CATALYSTS AND PROCESS FOR THE PRODUCTION OF ETHYLENIC POLYMERS BY USE THEREOF

[75] Inventor: Shintaro Inazawa, Oita, Japan

[73] Assignee: Showa Denko Kabushiki Kaisha, Tokyo, Japan

[21] Appl. No.: 256,186

[22] Filed: Apr. 21, 1981

[30] Foreign Application Priority Data

Apr. 23, 1980 [JP] Japan .............................. 55-52876
Apr. 24, 1980 [JP] Japan .............................. 55-53597
Feb. 27, 1981 [JP] Japan .............................. 56-26928

[51] Int. Cl.$^3$ ........................ C08F 4/02; C08F 10/02
[52] U.S. Cl. ............................... 526/124; 526/125; 526/141; 526/142; 526/348; 526/348.5; 526/348.6; 526/352; 526/906; 502/117; 502/123; 502/126; 502/134
[58] Field of Search .............. 526/125, 124, 141, 142

[56] References Cited

U.S. PATENT DOCUMENTS

| | | | |
|---|---|---|---|
| 4,242,479 | 12/1980 | Yakota et al. ........................ | 526/124 |
| 4,258,161 | 3/1981 | Kokogawa et al. ................ | 526/153 |
| 4,260,707 | 4/1981 | Sylvester et al. .................... | 526/153 |
| 4,304,891 | 12/1981 | Sato et al. ........................... | 526/125 |
| 4,321,345 | 3/1982 | Sato et al. ........................... | 526/125 |
| 4,335,015 | 6/1982 | Imai et al. ........................... | 526/125 |

*Primary Examiner*—Edward J. Smith
*Attorney, Agent, or Firm*—Sughrue, Mion, Zinn, Macpeak and Seas

[57] ABSTRACT

A process for the production of ethylenic polymers, characterized in that ethylene is homopolymerized or ethylene with α-olefin is copolymerized by the use of a catalyst system comprising:

(A) a solid catalyst component prepared by treating (1) a solid ingredient containing at least a magnesium atom, a halogen atom and a transition metal element with (2) at least a cyclic organic compound; and
(B) an organoaluminum compound; or
(A) the solid catalyst component;
(B) the organoaluminum compound; and
(C) an electron donor compound; and the catalyst systewm as obtained in the above-described manner.

Ethylenic polymers having a narrow distribution of molecular weight, having suitability for use in injection molding and having excellent powder characteristics can be produced, and by using this polymer, film having excellent optical characteristics can be produced.

16 Claims, No Drawings

POLYMERIZATION CATALYSTS AND PROCESS FOR THE PRODUCTION OF ETHYLENIC POLYMERS BY USE THEREOF

FIELD OF THE INVENTION

The present invention relates to a polymerization catalyst and a process for the production of ethylenic polymers by use of the polymerization catalyst.

BACKGROUND OF THE INVENTION

It has heretofore been known that a catalyst system, composed of a solid catalyst component containing a magnesium atom, a halogen atom, and a titanium atom, together with an organoaluminum compound, is an olefin polymerization catalyst of high activity.

It has been desired to produce an ethylenic polymer having a narrow distribution of molecular weight, which is suitable for use in injection molding and which can provide film having excellent optical characteristics. However, for the ethylenic polymer prepared by polymerizing ethylene alone or copolymerizing with α-olefin with a catalyst system which is believed to provide a narrow distribution of molecular weight, solvent extraction analysis using a solvent such as cyclohexane indicates that there is a significant amount of extract (extremely low molecular weight polymers). The presence of such extremely low molecular weight polymers causes problems such as fuming, nozzle dirt (dirt formed by the oozing of extremely low molecular weight polymers from molds) and unpleasant odor, during the process of molding of the ethylenic polymer. Furthermore, in the course of the polymerization of the ethylenic polymer, fouling (i.e., attachment of polymers to the walls of a reactor and other apparatuses) or bridging in a hopper in the after-treating step (e.g., pelletizing step) occurs.

These phenomena are more prominent in the case of copolymers prepared by copolymerizing ethylene with α-olefin. Particularly, in the case of medium density polyethylene comprising ethylene and a relatively large amount of α-olefin, and low density polyethylene, the extract content using a solvent such as n-hexane increases. This extract is composed of extremely low molecular weight polymers and extremely low density polymers. The amount of the extremely low density portion is determined by the breadth of the distribution of densities (the distribution of degrees of branching) which occurs at the copolymerization.

Furthermore, with the ethylenic polymer thus-formed, the distribution of the particle diameter is broad, and particularly, there is a large amount of fine powdery polymer. This fine powdery polymer causes the choking of a filter at a subsequent step such as drying, and furthermore causes problems in transferring the ethylenic polymer. In some cases, it may cause a powder explosion.

Japanese Patent Application (OPI) Nos. 73991/1977 (the term "OPI" as used herein refers to a "published unexamined Japanese patent application"), 76291/1977, 112984/1979 and 30983/1975 disclose processes for the polymerization of α-olefin, principally propylene, by the use of catalyst components which are prepared using an ether compound. These processes are directed to the production of stereoregular polymers having high crystallinity, and there are no disclosures concerning the homopolymerization of ethylene or the copolymerization of ethylene with α-olefin. When propylene is homopolymerized by the use of the solid catalyst components of the present invention, only traces of polymers are obtained. On the other hand, when ethylene is homopolymerized or ethylene with α-olefin is copolymerized by the use of the catalyst components as disclosed in the foregoing Applications, the distribution of molecular weight is broad and the distribution of density is broad and, therefore, a relatively large amount of extremely low molecular weight polymer is obtained. Thus, it is apparent that the catalyst systems as disclosed in the foregoing patents are basically different from that of the invention.

U.K. patent application No. 2,008,131 discloses the use of an ether compound as an electron donor compound in the preparation of a solid catalyst component. In this case, however, the amount of the ether compound used is less than that of the present invention. In this U.K. patent application, an organometal compound containing alkali metal or alkali earth metal and aluminum as a cocatalyst is used. In this U.K. patent application, the homopolymerization of an olefin is mainly described, and it is described that the polymerization catalyst has excellent performance. When ethylene is homopolymerized or ethylene with α-olefin is copolymerized by the use of a catalyst system wherein the organoaluminum compound of the present invention is used in place of the organoaluminum compound used in this U.K. patent application, polymers containing a large amount of extremely low molecular weight polymers are obtained as in the case as described hereinbefore.

Japanese Patent Application (OPI) No. 30983/1975 discloses a treatment of a solid component containing anhydrous magnesium chloride, an electron donor compound, titanium halogen compound, etc., with ethers. The ether compounds used in this method, however, are limited to chain-like ethers and, furthermore, the amount of the ether compound used is markedly less than that of the present invention.

U.S. Pat. No. 3,989,881 describes the preparation of a catalyst component using a cyclic ether and a production of propylenic polymers by the use of the catalyst component. In the preparation of the catalyst component, titanium tetrachloride and magnesium halide are coprecipitated with ethers, which is different from the solid catalyst component of the present invention.

U.S. Pat. No. 4,190,555 discloses a treatment using an ether compound as an oxygen-containing organic compound and a method of treating titanium halide. This method provides a polymerization catalyst component of α-olefin and particularly it discloses a method of treating titanium tetrahalide and a method of aging titanium tetrahalide. In this method, however, it is required that the catalyst component formred is colored from black-brown to black-purple. On the other hand, the solid catalyst component of the present invention is from white to gray or pink. Thus, the catalyst system of this method is different from that of the present invention.

French Pat. No. 2,392,038 discloses a method of treating using an electron donor compound to improve the catalyst activity and the stereoregularity. The amounts of the titanium compound and electron donor compound which can be used in the preparation of the catalyst component are greatly different from that of the present invention. This indicates that the catalyst system of this French Patent is a highly active catalyst for the polymerization of α-olefin (e.g., propylene), but that when it is used for the homopolymerization of ethylene or the copolymerization of ethylene with α-olefin, polymers having a broad distribution of molecular weight and a broad distribution of density are formed as in the case as described hereinbefore.

The catalyst systems as described in the foregoing literatures are to be used in the polymerization of α-olefin (principally, propylene) and they not only have excellent polymerization activity, but also provide good stereoregularity. However, ethylene homopolymers or ethylene-α-olefin copolymers prepared by the use of such catalyst systems contain therein a relatively large amount of extremely low molecular weight polymers. This demonstrates that catalyst systems which are effective in the polymerization of α-olefin are not always effective in the homopolymerization of ethylene or in the copolymerization of ethylene with α-olefin.

SUMMARY OF THE INVENTION

The object of the invention is to provide a polymerization catalyst for use in the production of an ethylenic polymer having a narrow distribution of molecular weight; a narrow distribution of particle diameter and a small amount of the extract content ussing a solvent, and to provide a process for the production of such ethylenic polymers by use of the polymerization catalyst.

The present invention provides a process for producing ethylenic polymers which comprises homopolymerizing ethylene or copolymerizing ethylene with α-olefin containing 3 to 12 carbon atoms by the use of a catalyst system comprising:

(A) a solid catalyst component prepared by treating (1) a solid ingredient containing 0.1 to 50% by weight of a magnesium atom, 0.01 to 30% by weight of at least one transition metal element selected from the group consisting of titanium, vanadium, zirconium and chromium, and at most 90% by weight of at least one halogen atom selected from the group consisting of a chlorine atom and a bromine atom, with (2) a 4- to 8-membered cyclic organic compound having a total number of oxygen and nitrogen atoms in the cyclic group of the cyclic organic compound of 1 to 3 and having a total number of carbon atoms in the substituent of at most 32, said cyclic organic compound being in the amount of 10 to 10,000 moles per gram equivalent of the transition metal element of the solid ingredient; and (B) an organoaluminum compound; and provide a catalyst system obtained in the manner as described abovve.

DETAILED DESCRIPTION OF THE INVENTION

(A) Solid Ingredient

The solid ingredient which can be used in the production of the solid catalyst component of the present invention contains a magnesium atom, at least one halogen atom and at least one transition metal element, i.e., titanium, vanadium, zirconium or chromium element. Of such solid ingredients, those prepared by treating a compound containing a magnesium atom and a trivalent titanium compound and/or a tetravalent titanium compound are preferred.

The method for the preparation of the solid ingredient may be performed in various manners. For example:

(a) The magnesium compound is treated with the transition metal compound alone;

(b) The magnesium compound is treated in combination with an electron donor compound, a polyether compound (molecular weight: about 400 to 10,000) and/or an alkyl metal compound in advance, and the resulting product is treated in combination with the transition metal compound;

(c) The magnesium compound is treated in combination with the transition metal compound, the electron donor compound, the polyether compound and/or the alkyl metal compound, at the same time or individually;

(d) The magnesium compound is treated in combination with the electron donor compound, the polyether compound and/or the alkyl metal compound in advance, and the thus-treated product is treated in combination with the transition metal compound, the electron donor compound, the polyether compound and/or the alkyl metal compound; and (e) The transition metal compound is treated in combination with the electron donor compound, the polyether compound and/or the alkyl metal compound in advance, and the product thus-treated is treated in combination with the magnesium compound.

(1) Magnesium Compound

Preferred examples of magnesium compounds which can be used in the preparation of the solid ingredient are magnesium compound represented by formulae (I) and (II) below, magnesium oxide and magnesium hydroxide.

Formula (I):

$$Mg(OR^1)_m X^1{}_{2-m} \qquad (I)$$

Formula (II):

$$MgR^2{}_n X^2{}_{2-n} \qquad (II)$$

wherein m is 0, 1 or 2, n is 1 or 2, $R^1$ and $R^2$ are each a hydrogen atom, or a hydrocarbon group containing at most 16 carbon atoms, i.e., are selected from the group consisting of an aliphatic hydrocarbon group containing from 1 to 16 carbon atoms, an alicyclic hydrocarbon group containing from 3 to 16 carbon atoms, and an aromatic hydrocarbon group containing from 6 to 16 carbon atoms, and $X^1$ and $X^2$ are each a halogen atom.

Hereinafter, similarly, the term "at most" is used to include the minimum number of carbon atoms in the group.

Preferred examples of $R^1$ and $R^2$ are a hydrogen atom, an alkyl group containing 1 to 12 carbon atoms and an aryl group containing 6 to 12 carbon atoms. Preferred examples of $X^1$ and $X^2$ are a chlorine atom, a bromine atom and an iodine atom, of which a chlorine atom and a bromine atom are particularly preferred.

Suitable examples of the magnesium compounds represented by Formula (I) include magnesium chloride, magnesium bromide, magnesium ethylate, magnesium butylate and hydroxymagnesium chloride. Suitable examples of the magnesium compounds represented by Formula (II) include butylethyl magnesium, dibutyl magnesium, ethylmagnesium chloride, butylmagnesium chloride, phenylmagnesium chloride, ethylmagnesium bromide, butylmagnesium bromide, and phenylmagnesium bromide.

(2) Transition Metal Compound

Examples of transition metal compounds which can be used in the preparation of the solid catalyst component include "compounds containing trivalent titanium and/or tetravalent titanium", heretofore used in the preparation of an ethylene polymerization catalyst (hereinafter referred to as "titanium compound"), compounds containing trivalent or tetravalent vanadium, compounds containing tetravalent zirconium, and compounds containing chromium. Of these transition metal compounds, titanium compounds are preferred. Typical examples of the titanium compounds include tetravalent titanium compounds represented by Formula (III) below, titanium trichloride obtained by the reduction of titanium tetrachloride with a metal (e.g., metallic titanium and metallic aluminum), hydrogen, or an organic metal compound, e.g., organoaluminum compound, organomagnesium compound, and eutectic titanium trichloride (for example, $nTiCl_3 \cdot AlCl_3$, wherein n is generally about 3).

Formula (III):

$$Ti(OR^3)_l X^3_{4-l} \quad (III)$$

wherein l is 0 or from 1 to 4, and $R^3$ is a hydrocarbon group containing at most 12 carbon atoms, selected from the group consisting of an aliphatic hydrocarbon group, an alicyclic hydrocarbon group and an aromatic hydrocarbon group. A preferred example of $R^3$ is an alkyl group containing at most 6 carbon atoms. Preferred examples of $X^3$ are a chlorine atom and a bromine atom, and a chlorine atom is particularly preferred.

Suitable examples of the tetravalent titanium compounds represented by Formula (III) include titanium tetrachloride, methoxytitanium trichloride, ethoxytitanium trichloride, butoxytitanium trichloride, dimethoxytitanium dichloride, diethoxytitanium dichloride, triethoxytitanium chloride, tetraethoxy titanium and tetrabutoxy titanium. Examples of other useful transition metal compounds include vanadium (III) trichloride, vanadium (IV) tetrachloride, vanadium oxytrichloride, zirconium tetrachloride, tetrabutoxy zirconium, and chromium chloride.

The trivalent titanium compounds, the eutectic titanium trichloride and the product obtained by treating a tetravalent titanium compound with an aftermentioned alkyl metal compound are most preferable.

(3) Electron Donor Compound and Inorganic Compound

In preparing the solid ingredient which can be used in the practice of the present invention, the electron donor compound and compounds such as an inorganic compound, a polyether compound and an alkyl metal compound as described hereinafter are not always required. The electron donor compound which can be used in the preparation of the solid ingredient or the solid catalyst component is an organic compound containing at least one polar group which is generally called a Lewis base. This electron donor compound is well known as a modifier for polymerization activity or crystallinity of the resulting polymer. Typical examples of such electron donor compounds include saturated or unsaturated aliphatic, alicyclic and aromatic compounds as described hereinafter.

Examples of such compounds include chain-like or cyclic ether compounds (preferably containing at most 24 carbon atoms such as diethyl ether, di-n-butyl ether, diisoamyl ether, dihexyl ether, ethoxybenzene, diphenyl ether, furan, tetrahydrofuran, dioxane and oxane), carboxylic acid compounds (preferably containing at most 18 carbon atoms such as benzoic acid, lactic acid, acetic acid and stearic acid), mono- and polyhydric alcohol compounds and phenol compounds (preferably containing at most 18 carbon atoms such as ethyl alcohol, n-butyl alcohol, phenol, n-methylphenol and ethylene glycol), anhydrides of the foregoing carboxylic acid compounds (e.g., acetic anhydride, phthalic anhydride and benzoic anhydride), ester compounds of the foregoing carboxylic acid compounds and alcohol or phenol compounds (e.g., ethyl benzoate, γ-butyllactone, phenyl acetate, ethyl acetate and butyl benzoate), aldehyde compounds (preferably containing at most 18 carbon atoms such as benzaldehyde, butylaldehyde, acrylaldehyde and cinnamaldehyde), ketone compounds (preferably containing at most 24 carbon atoms such as acetone, benzophenone, acetophenone, and cyclohexanone), halide compounds of the foregoing carboxylic acid compounds (e.g., acetyl chloride, benzoyl chloride, benzoyl bromide and cyclohexanecarbonyl chloride), silicic acid ester compounds containing at most 24 carbon atoms (e.g., tetramethyl silicate, tetraethyl silicate, tetracresyl silicate and trichloromethyl silicate), mono- and polysiloxane (preferably having a total number of silicon atoms of at most 1,000), amine compounds (preferably having a total number of carbon atoms of at most 36 such as tributylamine, dibutylamine, aniline, N,N-dimethylaniline, pyridine, pyran and pyrrolidine), amide compounds (preferably having a total number of carbon atoms of at most 36 such as N,N-dimethylbenzamide, acetamide, and N,N-dimethylhexane amide), and phosphoric acid ester compounds and phosphorous acid ester compounds (preferably having a total number of carbon atoms of at most 24 such as triphenyl phosphite, diphenyl phosphorochloride, triethyl phosphate and triphenyl phosphate).

As compounds other than the electron donor compound which can be used for the preparation of the solid ingredient or the solid catalyst component, any compounds can be used so long as they are not catalytic poisons for the solid ingredient or solid catalyst component.

Examples of inorganic compounds of such compounds include halides of the elements of Periodic Table Groups I to VIII (e.g., halides of aluminum, silicon and zinc), sulfuric acid salts, nitric acid salts, sulfurous acid salts, and nitrous acid salts.

(4) Alkyl Metal Compound

Alkyl metal compounds which can be used in the preparation of the solid ingredient or solid catalyst component are alkyl metal compounds derived from the metals of Group Ia, IIa, IIb and IIIa of the Periodic Table. Of these alkyl metal compounds, alkyl metal compounds of aluminum, magnesium, zinc, beryllium, lithium and sodium are preferred. Specifically, alkyl metal compounds of aluminum, magnesium, zinc and beryllium are suitable.

Suitable examples of such alkyl aluminum compounds are those represented by Formula (IV):

$$R^4_a Al(OR^5)_b H_c X^4_d \quad (IV)$$

wherein $R^4$ is an alkyl group containing at most 15 carbon atoms (particularly, an alkyl group containing at most 8 carbon atoms is preferred), R⁵ is an aliphatic or aromatic hydrocarbon group containing at most 15 carbon atoms (particularly, a hydrocarbon group containing at most 8 carbon atoms is preferred), and $X^4$ is a halogen atom, and $0 < a \leq 3$, $0 \leq b < 3$, $0 \leq c < 3$, $0 \leq d < 3$, and $a+b+c+d=3$.

Examples of the alkyl aluminum compounds represented by Formula (IV) include trialkylaluminum compounds such as triethylaluminum, tributylaluminum, triisopropylaluminum and trihexylaluminum, trialkenylaluminum compounds such as triisoprenylaluminum, dialkylaluminum alkoxides such as diethylaluminum ethoxide and dibutylaluminum butoxide, alkylaluminum sesquialkoxides such as ethylaluminum sesquiethoxide and butylaluminum sesquibutoxide, partially alkoxylated alkylaluminum compounds having an average composition represented by the formula: $R^4{}_{2.5}Al(OR^5)_{0.5}$, dialkylaluminum halide compounds such as diethylaluminum chloride, dibutylaluminum chloride and diethylaluminum bromide, alkylaluminum sesquihalide compounds such as ethylaluminum sesquichloride, butylaluminum sesquichloride and ethylaluminum sesquibromide, partially halogenated alkylaluminum compounds such as alkylaluminum dihalogenide (e.g., propylaluminum dichloride, butylaluminum dichloride and butylaluminum dibromide), dialkylaluminum hydride compounds such as diethylaluminum hydride and dibutylaluminum hydride, partially hydrogenated alkylaluminum compounds such as ethylaluminum dihydride, propylaluminum dihydride and butylaluminum dihydride, and partially alkoxylated and halogenated alkylaluminum compounds such as ethylaluminum ethoxy chloride, butylaluminum butoxy chloride and ethylaluminum ethoxy bromide.

Suitable examples of the alkyl metal compounds derived from magnesium, zinc and beryllium are those represented by Formula (V):

wherein $M^1$ is magnesium, zinc or beryllium, $R^6$ is an alkyl group containing at most 15 carbon atoms (particularly, an alkyl group containing at most 8 carbon atoms is preferred), $R^7$ is an aliphatic or aromatic hydrocarbon group containing at most 15 carbon atoms (particularly, a hydrocarbon group containing at most 8 carbon atoms is preferred), and $X^5$ is a halogen atom, and $0 < e \leq 2$, $0 \leq f < 2$, $0 \leq g < 2$, and $e+f+g=2$.

Examples of such alkylmagnesium compounds, alkylzinc compounds and alkylberyllium compounds represented by Formula (V) include dialkylmagnesium compounds such as diethylmagnesium, dibutylmagnesium and ethylbutylmagnesium, alkylmagnesium dioxides such as butylmagnesium butoxide, ethylmagnesium ethoxide, butylmagnesium ethoxide and ethylmagnesium butoxide, and alkylmagnesium compounds containing at least one alkyl group such as alkylmagnesium halide compounds (e.g., ethylmagnesium chloride, butylmagnesium bromide, ethylmagnesium bromide, and butylmagnesium chloride); dialkylzinc compounds such as diethylzinc, dibutylzinc and ethylbutylzinc; and dialkylberyllium compounds such as diethylberyllium and dibutylberyllium.

(5) Polyether Compound

The molecular weight of the polyether compounds which can be used in the preparation of the solid ingredient or the aforesaid solid catalyst component is from about 400 to about 10,000 and generally from about 600 to about 8,000. Typical polyether compounds are represented by the following Formulae (VI) to (VIII):

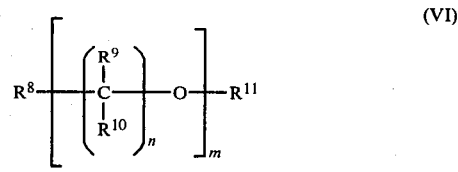

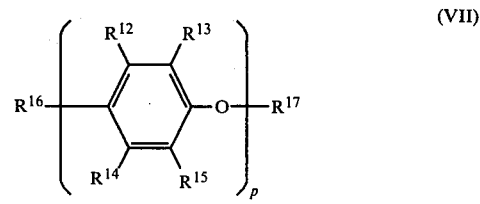

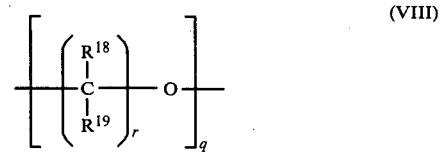

wherein $R^8$, $R^9$, $R^{10}$ and $R^{11}$, or $R^{12}$, $R^{13}$, $R^{14}$, $R^{15}$, $R^{16}$ and $R^{17}$, or $R^{18}$ and $R^{19}$ may be the same or different, $R^8$, $R^9$, $R^{10}$ and $R^{11}$ are each a hydrogen atom or a hydrocarbon group containing at most 8 carbon atoms, $R^{12}$, $R^{13}$, $R^{14}$, $R^{15}$, $R^{16}$ and $R^{17}$ are each a hydrogen atom or a hydrocarbon group containing at most 8 carbon atoms, $R^{18}$ and $R^{19}$ are each a hydrogen atom or a hydrocarbon group containing at most 8 carbon atoms, further $R^8$ and $R^{16}$ may be each a hydroxy group, furthermore $R^9$ and $R^{10}$ may be each a hydroxy group and ether group, ester group and silyl group having at most 24 carbon and/or silicon atoms, m ranges from 7 to 300, n ranges from 1 to 6, p ranges from 7 to 100, q is 6 or more, r ranges from 1 to 6, and n and r may be the same or different.

Of these polyether compounds, compounds represented by Formula (VI) and compounds wherein q is 12 or more are particularly preferred. Of polyether compounds represented by Formula (VI), those wherein $R^8$, $R^9$, $R^{10}$ and $R^{11}$ each contain at most 4 carbon atoms are desired. Generally, polyether compounds wherein the molecules are long and are bound together in the form of a straight chain and the molecular chain is flexible contribute to the formation of aggregates of the solid ingredient or solid catalyst component. Furthermore, in order to maintain the properties of the solid ingredient or aftersaid solid catalyst component, it is desirable that the proportion of chemically active groups in the molecule be small and that the chemical reactivity be low.

Preferred examples of polyether compounds which can be used in the preparation of the solid ingredient or solid catalyst component include polyethylene glycol, polypropylene glycol, polybutylene glycol, polyisobutylene glycol, polyethylene oxide, polypropylene oxide, polybutylene oxide, polyisobutylene oxide, crown ether, polystyrene oxide and polyphenylene glycol.

Epoxy ring-containing organic compounds (e.g., ethylene oxide, propylene oxide, glycidyl methacrylate, glycidyl phenyl ether and 3-glycidoxypropyltrimethoxysilane) capable of undergoing ring-open polymerization in the preparation of the solid ingredient or the solid catalyst component, becoming polyether compounds as described above can be used in place of the polyether compounds.

(6) Treating Method

In order to prepare the solid ingredient, the magnesium compound and the transition metal compound, or the magnesium compound, transition metal compound, electron donor compound, polyether compound and/or alkyl metal compound are treated. For this method for the preparation, a method of mechanically pulverizing these compounds (hereinafter referred to as a "copulverization method"), a method of bringing the compounds into contact with each other in the presence or in the absence of an inert solvent, etc., can be used.

For the copulverization method, a typical method in which a magnesium compound and a transition metal compound, or the magnesium and transition metal compounds, an electron donor compound and/or an alkyl metal compound are copulverized in a conventional method for preparation of an olefin polymerization solid catalyst component can be employed. This copulverization is usually carried out in an atmosphere of inert gas such as argon and nitrogen, and in the vicinity of room temperature. Although the time taken for the copulverization varies depending on the performance of the grinder, it is necessary to perform the copulverization to such an extent that the grain size of the pulverized product is about 500μ or less. The pulverized product can be used even though it is in an incompletely uniform state, but it is preferred that it is in a uniform state. Thus, the copulverization time is generally from about 5 minutes to about 24 hours.

In accordance with the contact method, the processing is performed in the presence of an inert solvent, or when at least one of the compounds to be treated is liquid and can be stirred in the liquid state, in the absence of the inert solvent. In this treating, dried inert solvents (i.e., solvents containing substantially no water) are used. Typical examples of such inert solvents have a boiling point of about 10° C. to 300° C. at normal pressure, and include aliphatic hydrocarbons (e.g., n-hexane, n-heptane and n-octane), alicyclic hydrocarbons (e.g., cyclohexane and dimethylcyclohexane), aromatic hydrocarbons (e.g., benzene, toluene and xylene), and halides thereof (e.g., tetrachloromethane, trichloroethylene and chlorobenzene).

When the solid catalyst component is prepared by treating the product which is obtained by treating previously the solid ingredient with the alkyl metal compound, the polyether compound and/or alkylene oxide compound, with the cyclic organic compound, a total amount of the alkyl metal compound, the polyether compound and the alkylene oxide compound is at most 200 parts by weight, preferably 0.01 to 100 parts by weight, and most preferably 0.01 to 50 parts by weight, per part by weight of the solid ingredient.

In this contact method, the ratio of solid material to liquid material in one liter of the treating system is about 1 to 500 g. Although the contact temperature varies depending on the type and ratio of the compounds to be treated, the contact time and other condition, it is usually from room temperature (20° C.) to 250° C. Although the contact time varies depending on the type and ratio of the compounds to be brought into contact with each other, the contact temperature and other conditions, it is usually about 5 minutes to about 24 hours.

In either of the copulverization method and the contact method, the molar ratio of the transition compound to the magnesium compound is from about 0.02:1 to 20:1. Where an electron donor compound is used, the amount of the electron donor compound used is usually about 50 moles or less per mole of the magnesium compound. Where the alkyl metal compound is used, the amount of the alkyl metal compound used is usually about 10 moles or less per mole of the transition metal compound.

(6) Purification (After-Treatment)

The thus-obtained solid ingredient is purified with an inert solvent as used in the method of treatment as described above until the transition metal compound, magnesium compound and electron donor compound (if used) remaining in the solid ingredient cannot be found in the solvent used, and then by removing the inert solvent used. In performing this purification, either decantation or filtration can be employed.

The transition metal element content of the solid ingredient thus-obtained is usually about 0.01% to 30% by weight and preferably from about 0.1% to 20% by weight. The magnesium atom content of the solid ingredient is usually from about 0.1% to about 50% by weight and preferably from 1% to 30% by weight, and the halogen atom content is usually at most about 90% by weight or less and preferably from about 30% to 80% by weight.

(B) Solid Catalyst Component

The solid catalyst component which can be used in the present invention can be prepared either by treating the solid ingredient as obtained above and a cyclic organic compound and optionally a polyether compound as described above, or by treating these compounds, an electron donor compound as described above (including the inorganic compounds as described above) and/or an alkyl metal compound.

(1) Cyclic Organic Compound

The cyclic organic compound which can be used in the preparation of the solid catalyst component of the present invention is an organic compound containing at least an oxygen atom and/or a nitrogen atom in the ring, which may be substituted. Examples of such substituents include a hydrocarbon group containing at most 16 carbon atoms, selected from an aliphatic hydrocarbon group and an aromatic hydrocarbon group, and a halogen atom. The number of carbon atoms in the total hydrocarbon groups is at most 32. The total number of the oxygen atom and the nitrogen atom is from 1 to 3, and the ring which contains the oxygen and/or nitrogen atom is constituted of 4 to 8 atoms. Further, this ring may be condensed with a benzene ring. Suitable examples of such cyclic organic compounds include oxetane, furan, tetrahydrofuran, 1,3-dioxolan, 2-methyloxolan, 2,5-dimethyloxolan, 3-methyloxolan, pyran, oxane, 2-methyloxane, 2,6-dimethyloxane, morpholine, 2,4,6-trimethyloxane, 1,4-dioxane, 2-methyl-1,4-dioxane, benzofuran, coumaran, benzopyran, chroman, isochromene, isochroman, pyridine, pyridazine, pyrimidine, pyrazine, triazine, quinoline, isoquinoline, acrylidine and benzoxazole. These cyclic organic compounds may be used singly or as a mixture of two or more of them.

(2) Treating Ratio

In the preparation of the solid catalyst component, the presence of the alkyl metal compound contributes to an increase in the polymerization activity of the catalyst system. The cause for this is not clear. Although it is supposed that the cyclic organic compound incorporated in a large amount into the solid catalyst component prevents the effective activation of the solid catalyst component by the organoaluminum compound which is used as a cocatalyst component in the polymerization, it is believed that the use of the alkyl metal compound in the treating to prepare the solid catalyst component contributes to the formation of the catalyst system in an effectively activated state.

Therefore, it is sufficient to use the alkyl metal compound in such an amount as to sufficiently activate the solid catalyst component. The amount of the alkyl metal compound used is such that the ratio of the metal alkyl group bond contained in the alkyl metal compound to the titanium atom existing in the solid ingredient is generally about 1:1 to 500:1, and preferably about 1:1 to 50:1.

The cyclic organic compound has the effect of narrowing the distribution of molecular weight of the resulting polymer. Particularly, in the copolymerization of ethylene with α-olefin, the cyclic organic compound has the significant effect of narrowing the distribution of density of the copolymer formed. It has heretofore been believed that the use of a high electron donor organic compound in the treating inhibits the polymerization activity of the resulting catalyst system and particularly the use of such cyclic organic compounds in a large amount results in the complete deactivation of the catalyst system. However, it has been found according to the present invention that when the cyclic organic compound is used in the preparation of the solid catalyst component of the present invention, it brings about the foregoing significant effects without the deactivation of the catalyst system. Specifically, the use of the alkyl metal compound in combination with the cyclic organic compound provides sufficiently high activity even though the cyclic organic compound is used in a large amount.

Therefore, the amount of the cyclic organic compound per the gram equivalents of titanium atom is generally from about 10 to 10,000 moles, desirably from about 10 to 3,000 moles, and more desirably from about 10 to 1,000 moles.

When the amount of the cyclic organic compound is extremely small, polymers containing considerable amounts of extremely low molecular weight polymers or polymers having extremely low density are obtained, therefore, problems described hereinbefore cannot be sufficiently solved. Consequently, the amount of the cyclic compound should be at least 0.5 part by weight, preferably 1 part by weight, per 1 part by weight of the solid ingredient. Since effects to be obtained by using the cyclic compound substantially cannot be increased by using an extremely large amount thereof, the amount of the cyclic compound is usually used not more than 1,000 parts by weight, preferably not more than 500 parts by weight, especially, not more than 300 parts by weight, per 1 part by weight of the solid ingredient.

When the solid catalyst component is prepared by treating the solid ingredient with the cyclic organic compound in the presence of the alkyl metal compound, the polyether compound and/or the alkylene oxide compound, or by treating the product which is obtained by treating previously the solid ingredient with the cyclic compound, with the alkyl metal compound, the polyether compound and/or alkylene oxide, a total amount of the alkyl metal compound, the polyether compound and the alkylene oxide compound is at most 200 parts by weight, preferably 0.01 to 100 parts by weight, and more preferably 0.01 to 50 parts by weight, per part by weight of the solid ingredient.

With regard to the ratio of the cyclic organic compound to the alkyl metal compound, the molar ratio of the cyclic organic compound to the metal alkyl group bond which the alkyl metal possesses is generally from about 1:1 to 10,000:1, desirably from about 1:1 to 1,000:1, and more desirably from about 6:1 to 1,000:1.

It is sufficient for the polyether compound to be used in an amount required to form a strong flock of the solid ingredient by the aggregation effect. The amount of the polyether compound used is generally at least about 0.1 part by weight per 100 parts by weight of the solid ingredient, although it varies depending on various factors.

The effect brought about by the use of the polyether compound is to improve the distribution of particle size of the ethylenic polymer formed. However, the polyether compound has no effect on the polymerization activity and, therefore, there is no use to employ the polyether compound in a large amount. Thus, the polyether compound is used in an amount of at most about 10 times (by weight) the weight of the solid ingredient and more specifically it is preferred to be used in an amount of about 1 to 100 parts by weight per 100 parts by weight of the solid ingredient.

When the treatment is performed using the electron donor compound and/or the alkyl metal compound for the preparation of the solid catalyst component of the invention, there is no special limitation to the amounts of the electron donor compound and alkyl metal compound used. In general, however, they are used in an amount of about 10,000 parts by weight, and preferably about 5,000 parts by weight or less, per part by weight of the solid ingredient.

The solid catalyst component of the present invention can also be prepared by treating the foregoing solid ingredient with the cyclic organic compound. The solid catalyst component prepared by treating the solid ingredient with the cyclic organic compound in the presence of at least one compound selected from the group consisting of the alkyl metal compound, the polyether compound and the ring-opened monomer (an alkylene oxide compound) exhibits the effect of the present invention as described hereinafter. Also, when the solid ingredient is previously treated with at least one compound selected from the group consisting of the alkyl metal compound, polyether compound and alkylene oxide compound to provide a treated product, and then the treated product thus-obtained is treated with the cyclic organic compound, the effect of the invention is exhibited. Furthermore, the catalyst can be prepared by treating the solid ingredient and cyclic organic compound, or the treated product as obtained above with at least one compound selected from the group consisting of the alkyl metal compound, polyether compound and alkylene oxide compound (alternatively, by previously treating one or two of the compounds, and then by treating the treated product thus-obtained with another compound).

The catalyst activity of the catalyst system of the invention can further be increased by using the alkyl metal compound. When the polyether compound and/or alkylene oxide compound is used, the particle diameter of the polymer finally obtained is further improved (that is, the amount of fine particles is reduced and the average particle diameter is increased). Where the alkylene oxide compound is used, it is preferred to treat prior to the treatment of the solid ingredient with the cyclic organic compound.

(3) Treating Method

The treatment of the solid ingredient with the polyether compound or with the electron donor compound and/or the alkyl metal compound in combination therewith is achieved by pulverizing in the same manner as described for the preparation of the foregoing solid catalyst component. This treatment is generally performed in an inert solvent. The treatment, however, can be performed in the absence of such inert solvents as long as the treatment system is in the state such that it can be fully stirred.

Where the treatment is performed in the inert solvent, the same inert solvents as used in the contact method of the methods as described hereinbefore for the preparation of the solid ingredient can be used. The inert solvent which can be used in this treating may be the same as or different from that used in the contact method.

Where three or more components are treated, they may be treated at the same time or a method may be employed in which some of the components are previously treated and then the remaining components are treated. Such methods include a method in which the solid ingredient is treated with the electron donor compound and/or the alkyl metal compound and thereafter with the polyether compound and a method in which the solid ingredient is treated with the polyether compound and thereafter with the electron donor compound and/or the alkyl metal compound.

When the treatment is performed by the use of polyether compounds which are in the solid state, they may be dissolved in various polar solvents which are not catalyst poisons and then treated.

Magnesium compounds which are used for the preparation of the solid ingredient can each be used singly or as a mixture of two or more of them. This is the same for the transition metal compound, electron donor compound, polyether compound (the inert solvent which can be used in the contact method) and/or the alkyl metal compound for use in the preparation of the solid ingredient, and the solid ingredient, cyclic organic compound, polyether compound, electron donor compound and/or alkyl metal compound, and inert solvent for use in the preparation of the solid catalyst component.

Although the treatment temperature varies depending on the type and amount of each of the solid ingredient, polyether compound, electron donor compound and alkyl metal compound, and the concentration thereof in the inert solvent, it is generally within the range of from −20° C. to 140° C., with the range of from 0° C. to 100° C. being particularly preferred.

When the treatment is performed in the inert solvent the treating concentration of the cyclic organic compound, the electron donor compound, the alkyl metal compound and the polyether compound is generally 0.01 g or more, preferably 0.1 g or more per liter of the inert solvent.

Although the treating time varies depending on the type and amount of each of the foregoing compounds, the concentration thereof in the inert solvent, and the treating time, it is generally sufficient to be from about 30 minutes to about 24 hours.

(4) Purification

The thus-obtained solid catalyst component is purified with an inert solvent either by a decantation or by a filtration.

However, when the total amount of the cyclic organic compound, polyether compound, electron donor compound and alkyl metal compound used is about 10 parts by weight or less per 100 parts by weight of the solid ingredient, it is generally not necessary to apply the washing. Thus, the solid catalyst component can be used as is as a catalyst ingredient for the production of the ethylenic polymer.

The transition metal element content of the solid catalyst component thus-formed is generally about 0.01% to 20% by weight.

The polymerization of ethylene alone or ethylene with an α-olefin in the presence of a catalyst system comprising the solid catalyst component, an organoaluminum compound (as described hereinafter), and optionally the electron donor compound and/or the alkyl metal compound results in the production of polymers having excellent powder characteristics.

(C) Organoaluminum Compound

Typical examples of organoaluminum compounds which are used in the homopolymerization of ethylene or in the copolymerization of ethylene with α-olefin include those represented by Formulae (IX), (X) and (XI) below:

Formula (IX):

$$AlR^{20}R^{21}R^{22} \qquad (IX)$$

Formula (X):

$$R^{23}R^{24}Al-O-AlR^{25}R^{26} \qquad (X)$$

Formula (XI):

$$AlR^{27}_{1.5}X^{6}_{1.5} \qquad (XI)$$

wherein $R^{20}$, $R^{21}$, and $R^{22}$ may be the same or different and are each an aliphatic, alicyclic, or aromatic hydrocarbon group containing at most 12 carbon atoms, a halogen atom or a hydrogen atom, and at least one of $R^{20}$, $R^{21}$, and $R^{22}$ is a hydrocarbon group as described above; $R^{23}$, $R^{24}$, $R^{25}$, and $R^{26}$ may be the same or different and are each the same hydrocarbon group as described above for $R^{20}$, $R^{21}$ and $R^{22}$; $R^{27}$ is a hydrocarbon group as described above for $R^{20}$, $R^{21}$ and $R^{22}$; and $X^6$ is a halogen atom.

Typical examples of organoaluminum compounds represented by Formula (IX) above include trialkylaluminum compounds, such as triethylaluminum, tripropylaluminum, tributylaluminum, trihexylaluminum and trioctylaluminum, alkylaluminum hydride compounds such as diethylaluminum hydride and diisobutylaluminum hydride, alkylaluminum halide compounds such as diethylaluminum chloride, and diethylaluminum bromide.

Typical examples of organoaluminum compounds represented by Formula (X) include alkyldialumoxane such as tetraethyldialumoxane and tetrabutyldialumoxane.

A typical example of organoaluminum compounds represented by Formula (XI) is ethylaluminum sesquichloride.

These organoaluminum compounds can each be used singly or as a mixture of two or more of them. Similarly, alkyl metal compounds which can be used in the preparation of the solid ingredient and the solid catalyst component can be used singly or as a mixture of two or more of them.

The catalyst system of the present invention may be composed of the solid catalyst component and the organoaluminum compound, or may be composed of the solid catalyst component, organoaluminum compound and the foregoing electron donor compound.

In the practice of the process of the invention, the solid catalyst component, the organoaluminum compound, and the electron donor compound (if used) may be introduced into a reactor (polymerization vessel) individually, or two or all of the ingredients may be mixed in advance and introduced thereinto. Alternatively, they may be diluted with an inert solvent, which is used as a solvent for the subsequent polymerization as described hereinafter, prior to the use thereof.

(D) Polymerization (1) Amounts of Solid Catalyst Component, Organoaluminum Compound, etc., Used The homopolymerization of ethylene or the copolymerization of ethylene with α-olefin can be performed by using well known methods, e.g., in an inert solvent, and furthermore they may be performed by a so-called gas phase method and a melt method which are known in the art. If desired, a molecular weight regulator (generally, hydrogen) may be present together.

In the practice of the present invention, there is no limitation to the amounts of the solid catalyst component and organoaluminum compound used. Preferably, however, the solid catalyst component and organoaluminum compound are used in an amount of about 1 mg to 1 g and about 0.1 to 10 millimoles, respectively, per liter of the inert organic solvent used in the liquid phase polymerization.

The amount of the organoaluminum compound used is generally within the range of about 1 to 1,000 moles per gram equivalent of the transition metal element contained in the solid catalyst component.

When the electron donor compound and/or the alkyl metal compound is used, the amount of the electron donor compound and/or the alkyl metal compound used is at most about 100 times (by weight) the weight of the organoaluminum compound.

(2) α-Olefin

In the practice of the invention, either ethylene alone may be polymerized or ethylene with α-olefin may be copolymerized.

The term "α-olefin" is used in this specification to mean hydrocarbons having from 3 to 12 carbon atoms and having a double bond at the terminal portion thereof.

Typical examples of such α-olefins include propylene, butene-1, 4-methylpentene-1, hexene-1, and octene-1, and a spent B—B fraction formed in a naphtha cracker. The ratio of the foregoing α-olefin in the ethylenic polymer formed is generally at most 30 mole%, preferably about 20 mole% or less, and particularly preferably about 15 mole% or less.

In the homopolymerization of ethylene or in the copolymerization of ethylene with α-olefin, solid catalyst components as described hereinbefore may each be used singly or as a mixture of two or more of them. This is the same with the organoaluminum compound, α-olefin to be used as a comonomer, and the inert organic solvent, electron donor compound and alkyl metal compound.

(3) Other polymerization Conditions

The polymerization temperature is generally from about $-10°$ C. to about $400°$ C. In a gas phase method, the temperature is not more than $200°$ C., preferably not more than $150°$ C., in a liquid phase method, the temperature is not more than $350°$ C., preferably not more than $300°$ C., and in a melt method, the temperature is not more than $400°$ C., preferably not more than $300°$ C.

Where the homopolymerization of ethylene or the copolymerization of ethylene with α-olefin is performed in an inert organic solvent, inert organic solvents which can be used are generally saturated aliphatic hydrocarbons containing 3 to 16 carbon atoms and saturated alicyclic hydrocarbons containing 5 to 8 carbon atoms. Examples of such hydrocarbons include propane, butane, isobutane, pentane, hexane, heptane, octane, decane, isoparaffin, cyclohexane, and 1-methylcyclohexane. These inert organic solvents can be used alone or in combination of two or more of them.

With regard to the type of the polymerization reactor, the method of controlling the polymerization, the amount of the organoaluminum compound, the type of the inert organic solvent, the after-treatment method after the polymerization, etc., there are no specific limitations resulting from the specific properties of the catalyst system of the invention, and thus any known method can be performed.

One of the main advantages of the invention is that the ethylene homopolymer or ethylene with α-olefin copolymer prepared by the use of the catalyst system of the invention is greatly narrowed in the distribution of molecular weight; that is, $\overline{M}w/\overline{M}n$ ($\overline{M}w$: weight average molecular weight; $\overline{M}n$: number average molecular weight) and HLMI/M.I. (HLMI: high load melt index; M.I.: melt index; methods of measuring these values will be explained hereinafter) are very small. This results in a marked reduction in the amount of extremely low molecular weight polymers (generally called "low polymers") in the ethylenic polymer formed.

For example, with regard to a polymer prepared using a catalyst system comprising a solid ingredient and an organoaluminum compound, the ratio: HLMI/M.I. is 40.7, as is shown in Comparative Example 1 hereinafter. On the other hand, with regard to a polymer prepared in the same manner as above except that a solid catalyst component prepared by treating the solid ingredient with a cyclic organic compound is used, the ratio: HLMI/M.I. is greatly reduced to 24.4 as shown in Table 1. As a result, the cyclohexane extraction amount, which indicates the extremely low molecular weight polymer content of the ethylenic polymer formed, is reduced to 0.13%.

The effect as described above is exhibited more significantly in the copolymerization of ethylene with α-olefin.

From the results shown in the examples and comparative examples explained hereinafter, it can be seen that the n-hexane extraction amount of the resulting ethylene with α-olefin copolymer with the solid catalyst component of the invention is markedly reduced. The solvent extraction amount of the ethylene-α-olefin copolymer increases with decreasing density of the copolymer (i.e., with increasing proportion of the α-olefin). Therefore, in the conventional polymerization methods, the amount of the extremely low molecular weight polymer and extremely low density polymer being eluted into the polymerization solvent is increased. This leads to a reduction in the amount of the resulting polymer, based on the monomer used. Therefore, this phenomenon is exhibited more significantly in the production of low density ethylenic polymers.

The examples and comparative examples as explained hereinafter are given to show the difference in the solvent extraction amount between the ethylenic polymers having nearly equal melt indexes and densities. The solvent extract of the ethylene homopolymer is composed of extremely low molecular weight polymers, whereas the solvent extract of the ethylene with α-olefin copolymer is composed mainly of extremely low density polymers. The reduction in the amount of the n-hexane extract by the application of the method of the present invention is believed to be due to the fact that the method of the present invention narrows the distribution of density of the copolymer formed by the process of the invention. This is a significant unexpected effect.

Thus this invention is based on the discovery of a catalyst system having the specific performance characteristics that, although the catalyst system has no polymerization activity in the homopolymerization of α-olefin such as propylene, it shows high polymerization activity in the homopolymerization of ethylene and in the copolymerization of ethylene with α-olefin.

This is believed due to the fact that in the copolymerization of ethylene with α-olefin, the α-olefin is polymerized selectively and regularly, permitting formation of copolymers having very narrow distributions of density comparing with those of the conventional methods.

Another advantage of the present invention is that, although a catalyst system obtained by the treatment of a solid ingredient using no magnesium compound (e.g., titanium trichloride) in the same manner as in the present invention does not have the polymerization activity, the catalyst system of the invention shows high polymerization activity in the homopolymerization of ethylene and in the copolymerization of ethylene with α-olefin.

Furthermore, the invention has an additional advantage that the polymer powder formed has excellent performance, particularly a high bulk density. Although the cause for this is not clear, it is believed that the resulting polymer is not swollen so much in the polymerization solvent so the powder performance is improved with high bulk density.

The advantages of the invention as described hereinbefore can be summarized as follows:

(1) With the ethylenic polymer formed in accordance with the invention, the distribution of molecular weight is narrow, and the amounts of extremely low molecular weight polymers and extremely low density polymers contained therein are very small. Thus, the ethylenic polymer is most suitable for use in injection molding and causes no problems of fuming, nozzle dirt and unpleasant odor during the process of the molding thereof, and can provide a film having excellent optical characteristics.

(2) During the course of the production of the ethylenic polymer, phenomena such as fouling and bridging virtually do not occur. Thus, the polymerization can be performed smoothly.

(3) Polymerization activity is so high that after-treatment such as the deactivation and the removal of the catalyst residue in the resulting polymer can be omitted, moreover, the alkyl metal compound which can be used in the production of the solid catalyst component increases the polymerization activity of the solid catalyst component.

(4) The use of the polyether compound in the preparation of the solid ingredient or solid catalyst component permits significant improvements in the distribution of particle diameter of the resulting ethylenic polymer and, in particular, to greatly reduce fine powder having a particle diameter of 100 microns or less. This can be seen by comparing the examples and the comparative examples as described hereinafter. For example, for the polymer prepared in Comparative Example 1, the amount of the fine powder having a particle diameter of 100 microns or less is about 38% by weight, whereas for the polymer prepared in Example 1, the amount of such fine powder is only about 0.1% by weight.

Since the amount of the fine powdery polymer contained in the ethylenic polymer formed by the process of the present invention is relatively small, the problems as described above can be solved. Furthermore, since the ethylenic polymer has good powder characteristics, undesirable phenomena such as fouling and bridging virtually do not occur during the polymerization thereof and, therefore, the polymerization can be performed smoothly. Furthermore, the ethylenic polymer can be smoothly dropped from a hopper during the pelletization thereof.

(5) In general with the low density polymer, the fluidity of powder tends to lower comparing with the ethylene homopolymer. Therefore, difficulties are frequently encountered in transferring the powder owing to the bridging, etc.

However, in accordance with the process of the present invention, even in the production of the low density ethylenic polymer having a density of 0.900 to 0.935 g/cc through the copolymerization of ethylene with α-olefin, the amount of fine powdery polymer can be greatly reduced. Therefore, the low density ethylenic polymer can be produced smoothly as the ethylene homopolymer.

(6) In the preparation of the solid catalyst component, the solid catalyst component precipitates very rapidly in the solvent. Therefore, the time required for various operations to be applied after the processing of the solid ingredient and polyether compound, and the time required for the washings after such operations, can be shortened. Furthermore, the amount of the washing solvent used can be reduced.

This is an additional unexpected advantage of the invention.

(7) With the polyether compound for use in the preparation of the solid catalyst component of the present invention, there is a chemically active group only at the terminal of the unit, the proportion occupied by the active group is small as the molecule of the polyether compound is very large, and the chemical reactivity of the polyether compound is very poor. Therefore, the polyether compound improves the performance of powder substantially without deteriorating the performance of the catalyst.

(8) By using the process of the present invention in combination with the technique which is well known to produce a low density ethylenic polymer, a low density ethylenic polymer can be produced more easily.

EXAMPLES AND COMPARATIVE EXAMPLES

Hereinafter, the invention will be explained in greater detail by reference to the following examples and comparative examples.

In the following examples and comparative examples, melt index (hereinafter referred to as "M.I.") was measured at a temperature of 190° C. and a load of 2.16 kg according to JIS K-6760 (ASTM D-1238-65T). High load melt index (hereinafter referred to as "HLMI") was measured at a temperature of 190° C. and a load of 21.6 kg according to JIS K-6760 (ASTM D-1238-65T). The density was measured according to ASTM D-1505-68T. The soluble content was determined by extracting the resulting polymer with a boiling solvent for 6 hours and is expressed in weight percent (%).

In each example and comparative example, compounds used in the preparation of the solid ingredient and the solid catalyst component and in the polymerization of the ethylenic polymer (for example, the inert solvent, ethylene, α-olefin, transition metal compound, magnesium compound, polyether compound, electron donor compound, alkyl metal compound, solid ingredient and organoaluminum compound) were substantially dehydrated prior to the use thereof. The preparation of the solid ingredient and the solid catalyst component, and the polymerization were performed substantially in the absence of water and in an atmosphere of nitrogen.

Examples 1 to 8 and Comparative Examples 1 to 3

(I) Preparation of Solid Ingredients and Solid Catalyst Components (1) Commercially available anhydrous magnesium chloride was dried by heating at about 500° C. for 15 hours under a stream of nitrogen. The resulting magnesium chloride (20.0 g, 0.21 mole), 4.0 g of A-type titanium trichloride and 2.7 g of methylphenyl polysiloxane (viscosity: 100 centistokes at a temperature of 25° C.) were placed in a cylindrical stainless steel pot having a capacity of 1 liter (packed with porcelain balls having a diameter of about 10 mm in an apparent volume of 50%). The pot was installed to a vibratory ball mill having a vibrational amplitude of 6 mm and a vibrating cycle of 30 Hz. Then copulverization was carried out for 8 hours to provide a uniform copulverized product (hereinafter referred to as "Solid Ingredient (1-1)"). Contents of titanium atom and magnesium atom in the Solid Ingredient (1-1) were determined by atomic absorption analysis and the content of chloride atom was determined by titration method. These analyses of the Solid Ingredient (1-1) showed that it contained 3.62% by weight of titanium atom, 18.9% by weight of magnesium atom and 66.9% by weight of chloride atom.

After 15.0 g of the Solid Ingredient (1-1) was placed into a glass flask having a capacity of 500 ml equipped with a mechanical agitator, 100 ml of toluene was added thereinto to suspend the Solid Ingredient (1-1) at a temperature of room temperature (about 25° C.) with stirring, and then 32 ml of pyridine as a cyclic organic compound was dropwise added thereto over a period of 2 hours. After the addition, the resulting mixture was raised to 80° C. with stirring, further the stirring was carried out at that temperature for 2 hours. Thereafter, the mixture was again cooled to room temperature, then n-hexane was added into the resulting reaction product until the total volume amounted to 400 ml. After the liquid which contained the reaction product was fully stirred, the liquid was sedimented, and the supernatant liquid was decanted. The reaction product was washed seven times as above. Thus, titanium atom was no longer detected in the supernatant liquid. Then, the resulting product thus-washed was dried under reduced pressure at 60° C. for 3 hours. Thus, a powdery solid product thus-purified (hereinafter referred to as "Solid Catalyst Component (1-A)") was obtained.

(2) After 200 ml of toluene was placed into the same 500 ml flask as described hereinabove, 15.0 g of AA-type titanium trichloride (prepared by reducing titanium tetrachloride with metallic aluminum) was added thereto. While stirring, 126.0 ml of tetrahydrofuran as a cyclic organic compound was dropwise added at room temperature over a period of 3 hours. After the dropwise addition, the resulting mixture was raised to 80° C. with stirring. Subsequently, the stirring was continued at that temperature for 2 hours, the mixture was allowed to cool down to nearly room temperature. The resulting reaction product was decanted and dried in the same manner as described for the purification of the Solid Catalyst Component (1-A). Thus, a solid product (hereinafter referred to as "Solid Catalyst Component (1-B)") was obtained.

(3) Copulverization was carried out in the same method as in the preparation of the Solid Ingredient (1-1) except that 2.0 g of silicon tetrachloride was used in place of A-type titanium trichloride. The copulverized product (15.0 g) thus-prepared was placed in the same 500 ml flask as described hereinabove, thereafter, 100 ml of n-heptane was added to suspend the copulverized product therein. While stirring the suspension thus-formed, 20.0 ml of titanium tetrachloride was added thereto, and the resulting mixture was raised to 60° C. with stirring. The mixture was reacted for 3 hours while stirring at that temperature and then allowed to cool down to nearly room temperature. The resulting reaction product was decanted and dried in the same manner as described for the purification of the Solid Catalyst Component (1-A). Thus, a solid product (hereinafter referred to as "Solid Ingredient (1-2)") was obtained.

Of the remainder of the foregoing reaction product, a 10.0 g portion was dropwise added to 200 ml of tetrahydrofuran as a cyclic organic compound at room temperature over a period of 4 hours. After the dropwise addition was completed, the resulting mixture was raised to 50° C. with stirring. Subsequently, the stirring was continued for 2 hours at this temperature. It was then allowed to cool down to nearly room temperature. The resulting reaction product was washed and dried in the same manner as described for the preparation of Solid Catalyst Component (1-A). Thus, a solid product (hereinafter referred to as "Solid Catalyst Component (1-C)") was obtained.

(4) After 22.8 g of magnesium ethylate was placed into the same 500 ml flask as described hereinabove, 17.0 g of titanium tetrabutylate was added thereto. The resulting mixture was raised to 170° C. and stirred for 3 hours at this temperature. The mixture was allowed to cool down to nearly room temperature, and 200 ml of hexane was added thereto. Furthermore, 118.3 g of ethylaluminum sesquichloride was dropwise added over a period of 3 hours. After the dropwise addition was completed, the resulting mixture was raised to 50° C. with stirring. Subsequently, the stirring was continued for 2 hours at this temperature. The mixture was allowed to cool down to nearly room temperature. The resulting reaction product was decanted and dried in the same manner as described for the purification of the Solid Catalyst Component (1-A). Thus, a solid product (hereinafter referred to as "Solid Ingredient (1-3)") was obtained.

After 15.0 g of the Solid Ingredient (1-3) thus-formed was placed into the 500 ml flask as described hereinabove, 100 ml of toluene was added thereto. The mixture was suspended, and 50 ml of tetrahydrofuran was dropwise added with stirring at room temperature over a period of 2 hours. After the dropwise addition was completed, the resulting mixture was raised to 80° C. with stirring. Subsequently, the stirring was continued at this temperature for 2 hours. The mixture was allowed to cool down to nearly room temperature. Thereafter, the resulting reaction product was decanted and dried in the same manner as described for the purification of the Solid Catalyst Component (1-A). Thus, a solid product (hereinafter referred to as "Solid Catalyst Component (1-D)") was obtained.

(5) After 200 ml of toluene was placed into the same 500 ml flask as described hereinabove, 2.0 g of hydroxymagnesium chloride was added and suspended therein. Thereafter, 7.4 ml of ethyl alcohol was dropwise added over a period of 2 hours with stirring. After the addition was completed, the resulting mixture was stirred at room temperature for 1 hour. To the resulting mixture (reaction product) was dropwise added 7.1 ml of diethylaluminum chloride at room temperature with stirring over a period of 2 hours in order to prepare a suspension, and then the resulting mixture was stirred at room temperature for 1 hour. Thereafter, 23.1 ml of titanium tetrachloride was added with stirring thereto. The resulting mixture was raised to 70° C. with stirring. Subsequently, the stirring was continued for 3 hours at this temperature. The resulting reaction product was decanted and dried in the same manner as described for the purification of the Solid Catalyst Component (1-A). Thus, a solid product (hereinafter referred to as "Solid Ingredient (1-4)") was obtained.

After a portion (2.0 g) of the resulting Solid Ingredient (1-4) was placed in the same 500 ml flask as described previously, 100 ml of toluene was added to prepare a suspension therein the Ingredient. To the suspension thus-formed was dropwise added 50.0 ml of dioxane as a cyclic organic compound over a period of 2 hours with stirring. The resulting reaction product was decanted and dried in the same manner as described for the purification of the Solid Catalyst Component (1-A). Thus, a solid product (hereinafter referred to as "Solid Catalyst Component (1-E)") was obtained.

(6) copulverization was carried out in the same manner as in the preparation of the Solid Ingredient (1-1) except that 1.9 g of A-type titanium trichloride (as used in the preparation of the Solid Ingredient (1-1)) and 2.9 g of silicon tetrachloride were used in place of A-type titanium trichloride and methylphenyl polysiloxane. The resulting reaction product was decanted and dried in the same manner as described for the purification of the Solid Catalyst Component (1-A). After a portion (15.0 g) of the resulting product thus-obtained was placed in the same 500 ml flask as described previously, 1.0 ml of dibutyl ether was dropwise added thereto with stirring at room temperature over a period of 2 hours. After the addition was completed, the resulting mixture was raised to 80° C. with stirring. Subsequently, the stirring was continued at that temperature for 2 hours. The mixture was then allowed to cool down to nearly room temperature. Thereafter, the resulting reaction product was decanted and dried in the same manner as described for the purification of the Solid Catalyst Component (1-A). Thus, a solid product (hereinafter referred to as "Solid Catalyst Component (1-F)") was obtained.

(7) A mixture of 18.1 g of the same anhydrous magnesium chloride as used in the preparation of Solid Ingredient (1-1) and 1.9 g of the same titanium trichloride as used in the preparation of Solid Ingredient (1-1) was co-pulverized in the same manner as in the preparation of Solid Ingredient (1-1) for 8 hours. Of the co-pulverized product thus obtained. After a portion (10.0 g) of the resulting product thus-obtained was placed in the same 500 ml flask as described previously, 100.0 ml of titanium tetrachloride was added thereto. After the resulting mixture was raised to 120° C. with stirring, the stirring was continued at that temperature for 2 hours. The mixture was allowed to cool down to nearly room temperature and then the resulting reaction product was decanted and dried in the same manner as described for the purification of the Solid Catalyst Component (1-A). Thus, a solid product (hereinafter referred to as "Solid Ingredient (1-5)") was obtained.

After a portion (8.0 g) of the Solid Ingredient (1-5) was placed in the same 500 ml flask as described previously, 80 ml of toluene was added thereto. Then, 50.0 ml of dioxane was dropwise added with stirring at room temperature over a period of 2 hours. After the addition was completed, the mixture was raised to 50° C. with stirring, and the stirring was continued at that temperature for 2 hours. Subsequently, the mixture thus-treated was allowed to cool down to nearly room temperature. The resulting reaction product was decanted and dried in the same manner as described for the purification of the Solid Catalyst Component (1-A). Thus, a solid product (hereinafter referred to as "Solid Catalyst Component (1-G)") was obtained.

(II) Homopolymerization of Ethylene

A thoroughly pre-dried 3.0 l stainless steel autoclave equipped with a mechanical agitator was purged with nitrogen. The autoclave was charged with each of the Solid Catalyst Components (1-A) to (1-D) or the Solid Ingredient (1-1) in the amount shown in Table 1-1 was placed as a main catalyst. Furthermore, 0.54 g of triethylaluminum (as an organoaluminum compound; cocatalyst) and 1kg of isobutane as an inert solvent were added thereto. After the autoclave was closed, the internal temperature was raised to the internal temperature shown in Table 1-1. Subsequently, hydrogen was introduced thereinto in the amount shown in Table 1-1, and furthermore 3.5 kg/cm$^2$ (gauge pressure) of ethylene was fed thereto. While maintaining the ethylene partial pressure at 3.5 kg/cm$^2$, ethylene was homopolymerized at the temperature shown in Table 1-1 for 2 hours. At the end of the time, the gas contents were released to terminate the polymerization. The ethylene homopolymer thus-formed was dried under reduced pressure at a temperature of 60° C. for 12 hours. The yield of the ethylene homopolymer and the polymerization activity are shown in Table 1-1. Furthermore, M.I., HLMI, $\overline{M}w$, $\overline{M}n$, bulk density and soluble content (measured using cyclohexane as a solvent) of the resulting ethylene homopolymers were measured. The results are shown in Table 1-2 along with HLMI/M.I. and $\overline{M}w/\overline{M}n$.

into the autoclave and furthermore ethylene was fed thereto so that the ethylene partial pressure was 3.5 kg/cm² (gauge pressure). The ethylene was fed under pressure so as to maintain the ethylene partial pressure at that level and α-olefin was introduced thereinto under pressure at the start of copolymerization. The kind and amount of the α-olefin are shown in Table 2-1. Thus, the ethylene with α-olefin were copolymerized for 2 hours. At the end of the time, the gas contents were released and the ethylene with α-olefin copolymer thus-formed were dried in the same manner as described in the preparation of the ethylene homopolymers. The yield of the copolymers and the polymerization activity are shown in Table 2-1. Furthermore, M.I., HLMI, $\overline{M}w$, $\overline{M}n$, net density, bulk density and soluble content (measured using n-hexane as a solvent) of the resulting copolymers were measured. The results are shown in Table 2-2 along with HLMI/M.I. and $\overline{M}w/\overline{M}n$.

TABLE 1-1

| No. | Main Catalyst Kind | Amount (mg) | Polymerization Temperature (°C.) | Hydrogen Pressure (kg/cm²G) | Yield (g) | Polymerization*¹ Activity |
|---|---|---|---|---|---|---|
| Example 1 | Solid Catalyst Component (1-A) | 32.3 | 85 | 3.5 | 185 | 820 |
| Comparative Example 1 | Solid Ingredient (1-1) | 22.5 | " | 3.0 | 183 | 1,160 |
| Comparative Example 2 | Solid Catalyst Component (1-B) | 43.8 | " | 3.5 | less than 5 | less than 16 |
| Example 2 | Component (1-C) | 32.9 | 80 | " | 225 | 980 |
| Example 3 | Component (1-D) | 21.7 | " | " | 148 | 970 |

*¹g/g = (main catalyst · time) · ethylene pressure (kg/cm²G)

TABLE 1-2

| No. | M.I. (g/10 min.) | HLMI/M.I. | $\overline{M}w/\overline{M}n$ | Soluble Content (%) | Bulk Density (g/cm³) |
|---|---|---|---|---|---|
| Example 1 | 1.03 | 24.4 | 3.7 | 0.13 | 0.43 |
| Comparative Example 1 | 0.85 | 40.7 | 4.6 | 2.52 | 0.26 |
| Comparative Example 2 | — | — | — | — | — |
| Example 2 | 1.31 | 25.2 | 3.3 | 0.32 | 0.41 |
| Example 3 | 1.70 | 23.0 | 3.1 | 0.29 | 0.42 |

(III) Copolymerization of Ethylene with α-Olefin

TABLE 2-1

| No. | Main Catalyst Kind | Amount (mg) | Hydrogen Pressure (kg/cm²G) | α-Olefin Kind | α-Olefin Amount | Yield (g) | Polymerization*¹ Activity |
|---|---|---|---|---|---|---|---|
| Example 4 | Solid Catalyst Component (1-A) | 30.7 | 1.5 | 1-Butene | 36 | 210 | 980 |
| Example 5 | Solid Catalyst Component (1-C) | 28.5 | " | 1-Butene | 44 | 265 | 1,330 |
| Example 6 | Solid Catalyst Component (1-D) | 19.6 | " | Propylene | 24 | 176 | 1,280 |
| Example 7 | Solid Catalyst Component (1-D) | 20.3 | 1.3 | 1-Butene | 70 | 168 | 1,180 |
| Example 8 | Solid Catalyst Component (1-G) | 25.8 | 1.5 | 1-Hexene | 64 | 141 | 780 |
| Comparative Example 3 | Solid Catalyst Component (1-F) | 20.6 | 1.2 | 1-Butene | 30 | 149 | 1,030 |

*¹g/g = (main catalyst) · time · ethylene pressure (kg/cm²G)

TABLE 2-2

| No. | M.I. (g/10 min.) | HLMI/M.I. | $\overline{M}w/\overline{M}n$ | Net Density (g/cm³) | Soluble Content (%) | Bulk Density (g/cm³) |
|---|---|---|---|---|---|---|
| Example 4 | 3.71 | 23.8 | 3.1 | 0.939 | 1.22 | 0.40 |
| Example 5 | 3.45 | 24.1 | 3.2 | 0.937 | 2.52 | 0.39 |
| Example 6 | 3.88 | 25.3 | 3.3 | 0.941 | 2.88 | 0.39 |
| Example 7 | 2.79 | 23.8 | 3.2 | 0.928 | 6.58 | 0.36 |
| Example 8 | 2.62 | 24.2 | 3.2 | 0.933 | 1.87 | 0.37 |
| Comparative Example 3 | 3.40 | 40.2 | 4.6 | 0.939 | 7.15 | 0.28 |

Each of Solid Catalyst Components (1-A), (1-C), (1-D), (1-F) and (1-G) in the amount shown in Table 2-1 was placed in the same autoclave as used hereinbefore as a main catalyst. Furthermore, 0.54 g of triethylaluminum and 1.0 kg of isobutane as an inert solvent were added thereto. The autoclave was then closed and the internal temperature was raised to 80° C. Thereafter, 1.5 kg/cm² (gauge pressure) of hydrogen was introduced Examples 9 to 16 and Comparative Examples 4 to 6

(I) Preparation of Solid Ingredients and Solid Catalyst Components (1) Commercially available anhydrous magnesium chloride was dried by heating at about 500° C. for 15 hours under a stream of nitrogen. The resulting magnesium chloride (20.0 g, 0.21 mole) and 4.0 g of titanium tetrachloride were placed in a cylindrical stainless steel pot having a capacity of 1 liter (packed with porcelain balls having a diameter of about 10 mm in an apparent volume of 50%). The pot was installed to a vibratory ball mill having a vibrational amplitude of 6 mm and a vibrating cycle of 30 Hz. Then copulverization was carried out for 8 hours to provide a uniform copulverized product (hereinafter referred to as "Solid Ingredient (2-1)"). Contents of titanium atom and magnesium atom in the Solid Ingredient (2-1) were determined by atomic absorption analysis and the content chloride atom was determined by titration method. These analysis of the Solid Ingredient (2-1) showed that it contained 4.25% by weight of titanium atom, 21.0% by weight of magnesium atom and 74.6% by weight of chloride atom.

After 15.0 g of the Solid Ingredient (2-1) was placed into a glass flask having a capacity of 500 ml equipped with a mechanical agitator, 100 ml of toluene was added thereinto to suspend the Solid Ingredient (2-1) at a temperature of room temperature (about 25° C.) with stirring, and then 32 ml of pyridine (as a cyclic organic compound) was dropwise added over a period of 2 hours. After the addition was completed, the resulting mixture was raised to 80° C. with stirring. Subsequently, the stirring was continued at that temperature for 2 hours. After the mixture was again cooled to room temperature, 13.2 ml of a 1.0 mole/l toluene solution of diethylaluminum hydride (as an alkyl metal compound) was dropwise added thereto. After the addition was completed, the resulting mixture was raised to 60° C. with stirring. Subsequently, the stirring was continued at this temperature for 2 hours. Subsequently, the resulting mixture containing the reaction product was cooled down to room temperature. The resulting reaction product was decanted and dried in the same manner as described for the purification of the Solid Catalyst Component (1-A). Thus, a solid product (hereinafter referred to as "Solid Catalyst Component (2-A)") was obtained.

(2) After 200 ml of toluene was placed into the same 500 ml flask as described hereinabove, 5.0 ml of titanium tetrachloride was added thereto. While stirring, 80.0 ml of tetrahydrofuran (as a cyclic organic compound) was dropwise added at room temperature over a period of 3 hours. After the addition was completed, the resulting mixture was raised to 80° C. with stirring. Subsequently, the stirring was continued at that temperature for 2 hours. The mixture was allowed to cool down to nearly room temperature. Then, 45.6 ml of a 1 mole/l toluene solution of triethylaluminum was dropwise added thereto over a period of 2 hours. After the addition was completed, the resulting mixture was raised to 60° C. and stirred at that temperature for 2 hours. Then, the reaction product thus-formed was washed and dried in the same manner as described for the preparation of Solid Catalyst Component (2-A). Thus, a solid product (hereinafter referred to as "Solid Catalyst Component (2-B)") was obtained.

(3) The procedure of the copulverization as described for the preparation of Solid Ingredient (2-1) was repeated with the exception that 2.0 g of silicon tetrachloride was used in place of the titanium tetrachloride. After a portion (15.0 g) of the resulting product was placed in the same 500 ml flask as described previously, 100 ml of n-heptane was added thereto to suspend the portion therein. To the suspension thus-formed was added with stirring 20.0 ml of titanium tetrachloride. The resulting mixture was raised to 60° C. with stirring. Subsequently, the stirring was continued for 3 hours at this temperature. The reaction mixture was then allowed to cool down to nearly room temperature. The resulting reaction product was decanted and dried in the same manner as described for the purification of the Solid Catalyst Component (1-A). Thus, a solid product (hereinafter referred to as "Solid Ingredient (2-2)") was obtained.

To a portion (10.0 g) of the remainder of the reaction product as obtained above was dropwise added to 200 ml of tetrahydrofuran (as a cyclic organic compound) at room temperature over a period of 4 hours with stirring. After the addition was completed, the mixture was raised to 50° C. with stirring. Subsequently, the stirring was continued for 2 hours at this temperature. It was then allowed to cool down to nearly room temperature. After 42.0 ml of a 1 mole/l toluene solution to triisobutylaluminum (as an alkylmetal compound) was dropwise added over a period of 2 hours with stirring, the resulting mixture was raised to 50° C. with stirring. Subsequently, the stirring was continued at that temperature for 2 hours, the mixture was allowed to cool down to nearly room temperature. The resulting reaction product was decanted and dried in the same manner as described for the purification of the Solid Catalyst Component (1-A). Thus, a solid product (hereinafter referred to as "Solid Catalyst Component (2-C)") was obtained.

(4) After 50 ml of toluene was placed into the same 500 ml flask as described hereinabove, 15.0 g of Solid Ingredient (2-1) was added thereto. While stirring, 50.0 ml of tetrahydrofuran (as a cyclic organic compound) was dropwise added at room temperature over a period of 4 hours, and the resulting mixture was then stirred for 2 hours. Subsequently, 13.0 ml of a 2.0 mole/l heptane solution of n-butylethylmagnesium (as an alkyl metal compound) was dropwise added at room temperature over a period of 2 hours, and the stirring was continued at this temperature for 2 hours. Then, about 300 ml of n-hexane was added thereto, and the resulting mixture was fully stirred and then allowed to stand to precipitate a solid product. The resulting reaction product was decanted and dried in the same manner as described for the purification of the Solid Catalyst Component (1-A). Thus, a solid product (hereinafter referred to as "Solid Catalyst Component (2-D)") was obtained.

(5) The same procedure as used for the preparation of Solid Catalyst Component (2-A) was carried out with the exception that 13.2 ml of a 1.0 mole/l toluene solution of diethylaluminum chloride was used in place of the toluene solution of diethylaluminum hydride. The resulting reaction product was decanted and dried in the same manner as described for the purification of the Solid Catalyst Component (1-A). Thus, a solid product (hereinafter referred to as "Solid Catalyst Component (2-E)") was obtained.

(6) After 11.4 g of magnesium ethylate was placed into the same 500 ml flask as described hereinabove, 17.0 g of titanium tetrabutylate was added thereto. The resulting mixture was raised to 170° C. with stirring. Subsequently, the stirring was continued for 2 hours at this temperature. The mixture was allowed to cool down to nearly room temperature. Then, 200 ml of hexane was added and 63.5 g of ethylaluminum dichloride was dropwise added over a period of 3 hours. After the addition was completed, the resulting mixture was raised to 50° C. with stirring. Subsequently, the stirring was continued for 2 hours at this temperature. The mixture was allowed to cool down to nearly room temperature. The resulting reaction product was decanted and dried in the same manner as described for the purification of the Solid Catalyst Component (1-A). Thus, a solid product (hereinafter referred to as "Solid Ingredient (2-3)") was obtained.

After a portion (15.0 g) of the resulting Solid Ingredient (2-3) was placed in the 500 ml flask as described previously, 100 ml of toluene was added thereto. The resulting mixture was suspended, and 50 ml of tetrahydrofuran was dropwise added with stirring over a period of 2 hours. After the addition was completed, the resulting mixture was raised to 80° C. with stirring. Subsequently, the stirring was continued for 2 hours at this temperature and then allowed to cool down to nearly room temperature. The, 9.0 ml of a 1.0 mole/l toluene solution of triisobutylaluminum was dropwise added thereto over a period of 1 hour with stirring. After the addition was completed, the resulting mixture was raised to 60° C. with stirring. Subsequently, the stirring was continued for 2 hours at this temperature. Subsequently, the mixture was allowed to cool down to nearly room temperature. The resulting reaction product was decanted and dried in the same manner as described for the purification of the Solid Catalyst Component (1-A). Thus, a solid product (hereinafter referred to as "Solid Catalyst Component (2-F)") was obtained.

(7) After 100 ml of n-hexane was placed in the same 500 ml flask as described hereinabove, 2.0 g of the same pulverized magnesium chloride as used in the copulverization for the preparation of Solid Ingredient (2-1) was added and suspended therein. Then, 7.4 ml of ethyl alcohol was dropwise added with stirring over a period of 2 hours. After the addition was completed, the mixture was stirred at room temperature for 1 hour. To the suspension thus-formed was dropwise added 7.1 ml of diethylaluminum chloride at room temperature over a period of 1 hour, and then the resulting mixture was stirred at room temperature for 1 hour. Subsequently, 23.1 ml of titanium tetrachloride was added, and the resulting mixture was raised to 70° C. and stirred at that temperature for 3 hours. The resulting reaction product was decanted and dried in the same manner as described for the purification of the Solid Catalyst Component (1-A). Thus, a solid product (hereinafter referred to as "Solid Ingredient (2-4)") was obtained.

After a portion (2.0 g) of the resulting Solid Ingredient (2-4) was placed in the same 500 ml flask as described previously, 100 ml of toluene was added to suspend the Ingredient therein. To the suspension thus-formed was dropwise added 50.0 ml of dioxane (as a cyclic organic compound) over a period of 2 hours.

After the addition was completed, the resulting mixture was raised to 80° C. with stirring. Subsequently, the stirring was continued for 2 hours at this temperature. The mixture was then allowed to cool down to nearly room temperature, and 9.0 ml of a 1.0 mole/l toluene solution of diethylaluminum chloride was dropwise added over a period of 1 hour with stirring. After the addition was completed, the resulting mixture was raised to 60° C. with stirring. Subsequently, the stirring was continued for 2 hours at this temperature, and allowed to cool down to nearly room temperature. The resulting reaction product was decanted and dried in the same manner as described for the purification of the Solid Catalyst Component (1-A). Thus, a solid product (hereinafter referred to as "Solid Catalyst Component (2-G)") was obtained.

A mixture of 18.1 g of the same pulverized magnesium chloride as used in the preparation of Solid Ingredient (2-1), 1.9 g of titanium trichloride and 2.9 g of silicon tetrachloride was copulverized for 8 hours in the same manner as in the preparation of Solid Ingredient (2-1). The resulting reaction product was decanted and dried in the same manner as described for the purification of the Solid Catalyst Component (1-A). Thus, a solid product (hereinafter referred to as "Solid Ingredient (2-5)") was obtained.

After a portion (15.0 g) of the resulting Solid Ingredient (2-5) was placed in the same 500 ml flask as described previously, 50 ml of tetrahydrofuran was dropwise added thereto at room temperature over a period of 2 hours. After the addition was completed, the resulting mixture was raised to 80° C. with stirring. Subsequently, the stirring was continued for 2 hours at this temperature. After the mixture was allowed to cool down to nearly room temperature, 7.0 ml of a 1.0 mole/l toluene solution of diethylaluminum chloride was dropwise added with stirring over a period of 1 hour. After the addition was completed, the resulting mixture was raised to 60° C. with stirring. Subsequently, the stirring was continued for 2 hours at this temperature. Then, the mixture was allowed to cool down to nearly room temperature. The resulting reaction product was decanted and dried in the same manner as described for the purification of the Solid Catalyst Component (1-A). Thus, a solid product (hereinafter referred to as "Solid Catalyst Component (2-H)") was obtained.

(9) After 10.0 g of Solid Ingredient (2-1) was placed into the same 500 ml flask as described hereinabove, 30 ml of toluene was added thereto to suspend the Ingredient therein. Then, 30.0 ml of tetrahydrofuran was dropwise added with stirring at room temperature over a period of 2 hours. After the addition was completed, the resulting mixture was raised to 80° C. with stirring. Subsequently, the stirring was continued for 2 hours at this temperature. Thereafter, the mixture was allowed to cool down to nearly room temperature, and 12.7 ml of a 1.0 mole/l ethyl ether solution of n-butylmagnesium chloride was dropwise added with stirring over a period of 1 hour. After the addition was completed, the resulting mixture was raised to 60° C. with stirring. Subsequently, the stirring was continued for 2 hours at this temperature. The mixture was then allowed to cool down to nearly room temperature. The resulting reaction product was decanted and dried in the same manner as described for the purification of the Solid Catalyst Component (1-A). Thus, a solid product (hereinafter referred to as "Solid Catalyst Component (2-J)") was obtained.

(10) In the same manner as in the preparation of Solid Catalyst Component (2-A) with the exception that the diethylaluminum hydride was not used, a catalyst component (hereinafter referred to as "Solid Catalyst Component (2-K)") was prepared.

(11) In the same manner as in the preparation of Solid Catalyst Component (2-A) with the exception that the pyridine was not used, and that 13.2 ml of a 1.0 mole/l toluene solution of triethylaluminum was used in place of the toluene solution of diethylaluminum hydride which had been used as the alkyl metal compound, a catalyst component (hereinafter referred to as "Solid Catalyst Component (2-L)") was prepared.

(12) A mixture of 18.1 g of the same anhydrous magnesium chloride as used in the preparation of Solid Ingredient (2-1), 1.9 g of AA-type titanium trichloride, and 1.9 g of titanium tetrachloride was copulverized for 8 hours in the same manner as in the preparation of Solid Ingredient (2-1). The resulting reaction product was decanted and dried in the same manner as described for the purification of the Solid Catalyst Component (1-A).

After a portion (15 g) of the resulting product was placed in the same 500 ml flask as described previously, 100 ml of diethyl ether was dropwise added thereto with stirring over a period of 2 hours at room temperature. After the mixture was stirred at this temperature for 2 hours, 14.0 ml of a 1.0 mole/l toluene solution of triethylaluminum was dropwise added thereto over a period of 2 hours. Furthermore, it was stirred at this temperature for 2 hours. The resulting reaction product was decanted and dried in the same manner as described for the purification of the Solid Catalyst Component (1-A). Thus, a solid product (hereinafter referred to as "Solid Catalyst Component (2-M)") was obtained.

(II) Homopolymerization of Ethylene

Homopolymerization of ethylene was conducted in the same manner as in Example 1 except that each of solid catalyst components shown in Table 3-1 in the amount shown in the Table 3-1 was used instead of Solid Catalyst Component (1-A), and dried in the same manner as in Example 1. The yield of the ethylene homopolymer and the polymerization activity are shown in Table 3-1. Further, M.I., HLMI, $\overline{M}w$, $\overline{M}n$, bulk density and soluble content (using cyclohexane as a solvent) of the resulting homopolymers were measured. The results, and HLMI/M.I. and $\overline{M}w/\overline{M}n$ are shown in Table 3-2.

TABLE 3-1

| No. | Main Catalyst Kind | Amount (mg) | Polymerization Temperature (°C.) | Hydrogen Pressure (kg/cm²G) | Yield (g) | Polymerization*[1] Activity |
|---|---|---|---|---|---|---|
| Comparative Example 4 | Solid Ingredient (2-1) | 13.2 | 85 | 3.0 | 293 | 3,170 |
| Comparative Example 5 | Solid Catalyst Component (2-B) | 38.5 | " | 3.5 | 5 | 19 |
| Example 9 | Solid Catalyst Component (2-C) | 32.0 | 80 | " | 388 | 1,730 |
| Example 10 | Solid Catalyst Component (2-D) | 10.5 | 85 | " | 350 | 4,760 |
| Example 11 | Solid Catalyst Component (2-F) | 20.0 | 80 | " | 360 | 2,570 |
| Example 12 | Solid Catalyst Component (2-G) | 19.7 | 85 | " | 234 | 1,700 |
| Example 13 | Solid Catalyst Component (2-K) | 24.8 | " | " | 84 | 480 |
| Example 14 | Solid Catalyst Component (2-E) | 27.5 | " | " | 245 | 1,270 |
| Example 15 | Solid Catalyst Component (2-H) | 14.0 | " | " | 127 | 1,300 |
| Example 16 | Solid Catalyst Component (2-J) | 18.1 | " | " | 304 | 2,400 |
| Comparative Example 6 | Solid Catalyst Component (2-L) | 10.2 | " | 2.5 | 274 | 3,840 |

*[1] g/g (= main catalyst) · time · ethylene pressure (kg/cm²)

TABLE 3-2

| No. | M.I. (g/10 min.) | HLMI/M.I. | $\overline{M}w/\overline{M}n$ | Soluble Content (%) | Bulk Density (g/cm³) |
|---|---|---|---|---|---|
| Comparative Example 4 | 1.22 | 41.1 | 4.6 | 2.43 | 0.28 |
| Comparative Example 5 | — | — | — | — | — |
| Example 9 | 1.55 | 24.4 | 3.3 | 0.35 | 0.42 |
| Example 10 | 2.81 | 25.3 | 3.2 | 0.42 | 0.40 |
| Example 11 | 0.92 | 23.8 | 3.0 | 0.38 | 0.41 |
| Example 12 | 2.27 | 24.8 | 3.3 | 0.43 | 0.42 |
| Example 13 | 1.03 | 25.2 | 3.3 | 0.28 | 0.38 |
| Example 14 | 1.41 | 25.0 | 3.2 | 0.40 | 0.35 |
| Example 15 | 1.10 | 24.0 | 3.2 | 0.35 | 0.38 |
| Example 16 | 1.82 | 23.2 | 3.0 | 0.31 | 0.41 |
| Comparative Example 6 | 0.88 | 43.2 | 4.7 | 2.88 | 0.30 |

Examples 17 to 20 and Comparative Example 7

Each of solid catalyst components shown in Table 4-1 was placed in the same autoclave as used in the foregoing examples as a main catalyst in the amount shown in Table 4-1. Additionally, 0.54 g of triethylaluminum and 1.0 kg of isobutane as an inert solvent were added thereto. The autoclave was then closed and the internal temperature was raised to 80° C. Then, 1.5 kg/cm² (gauge pressure) of hydrogen was introduced into the autoclave and, furthermore, ethylene was introduced thereinto so that the ethylene partial pressure was 3.5 kg/cm² (gauge pressure). By introducing ethylene under pressure so as to maintain the ethylene partial pressure and at the same time, by introducing α-olefin (the kind and the amount of α-olefin used are shown in Table 4-1) at the start of polymerization, ethylene and α-olefin were copolymerized for 2 hours. At the end of the time, the gas contents were released and dried the polymer in the same manner as in Example 1. The yield of the copolymer formed and the polymerization activity are shown in Table 4-1. Furthermore, M.I., HLMI, $\overline{M}w$, $\overline{M}n$, net density, bulk density and soluble content (using n-hexane as a solvent) of the resulting copolymer were measured. The results obtained are shown in Table 4-2 along with HLMI/M.I. and $\overline{M}w/\overline{M}n$.

TABLE 4-1

| No. | Main Catalyst Kind | Amount (mg) | α-Olefin Kind | Amount (g) | Yield (g) | Polymerization[*1] Activity |
|---|---|---|---|---|---|---|
| Example 17 | Solid Catalyst Component (2-A) | 12.0 | 1-Butene | 40 | 200 | 2,380 |
| Example 18 | Solid Catalyst Component (2-C) | 18.5 | 1-Butene | 70 | 290 | 2,240 |
| Example 19 | Solid Catalyst Component (2-F) | 13.1 | Propylene | 36 | 257 | 2,800 |
| Example 20 | Solid Catalyst Component (2-G) | 13.9 | 1-Hexene | 70 | 182 | 1,870 |
| Comparative Example 7 | Solid Catalyst Component (2-M) | 15.4 | 1-Butene | 36 | 287 | 2.660 |

[*1] g/g (= main catalyst) · time · ethylene pressure (kg/cm$^2$)

TABLE 4-2

| No. | M.I. (g/10 min.) | HLMI/M.I. | $\overline{M}w/\overline{M}n$ | Net Density (g/cm$^3$) | Soluble Content (%) | Bulk Density (g/cm$^3$) |
|---|---|---|---|---|---|---|
| Example 17 | 3.52 | 24.1 | 3.3 | 0.938 | 1.32 | 0.35 |
| Example 18 | 5.41 | 24.7 | 3.3 | 0.925 | 6.85 | 0.40 |
| Example 19 | 3.80 | 23.9 | 3.1 | 0.927 | 9.37 | 0.38 |
| Example 20 | 2.81 | 26.8 | 3.7 | 0.935 | 0.92 | 0.40 |
| Comparative Example 7 | 2.81 | 41.5 | 4.6 | 0.937 | 6.88 | 0.32 |

From the results shown in Tables hereinabove, it can be seen that both the ethylene homopolymer and the ethylene with α-olefin copolymer prepared by the use of the catalyst system comprising the solid catalyst component and organoaluminum compound are narrow in the distribution of molecular weight and thus are suitable for use in injection molding and for molding film having excellent optical characteristics and furthermore they have high bulk densities. Moreover, it is apparent that the polymerization activity of the catalyst system is high.

Examples 21 to 24

(I) Preparation of Solid Ingredient and Solid Catalyst Component (1) Copulverization was carried out in the same method as in the preparation of the Solid Ingredient (1-1) except that 35.0 g of anhydrous magnesium chloride was used in place of 10.0 g thereof and 15.0 g of AA-type titanium trichloride was used in place of A-type titanium trichloride (hereinafter referred to as "Solid Ingredient (3-1)").

Contents of titanium atom and magnesium atom in the solid Ingredient (3-1) were determined by atomic absorption analysis and the content of chloride atom was determined by titanium method. These analyses of the Solid Ingredient (3-1) showed that it contained 7.1% by weight of titanium atom, 17.7% by weight of magnesium atom and 72.0% by weight of chloride atom.

After a portion (3.0 g) of the resulting Solid Ingredient (3-1) was placed in the same 500 ml flask as described previously, 200 ml of n-hexane was added thereto. The resulting mixture was stirred to provide a uniform suspension. To the suspension thus-formed was added 0.3 g of polypropylene glycol (of the diol type; molecular weight: 2,000), and the resulting mixture was fully stirred at room temperature for 1 hour and then allowed to stand. The supernatant was withdrawn and 100 ml of toluene was added to the residue. Then, 5.0 g of tetrahydrofuran was added, and the mixture thus-formed was fully stirred at 60° C. for 2 hours. After the mixture was allowed to cool down to room temperature, the resulting reaction product was decanted and dried in the same manner as described for the purification of the Solid Catalyst Component (1-A). Thus, a powdery solid product (hereinafter referred to as "Solid Catalyst Component (3-A)") was obtained.

(2) After 11.4 g of magnesium ethylate was placed into the same flask as described hereinabove, 17.0 g of titanium tetrabutyrate was added thereto. The resulting mixture was heated to 170° C. with stirring. Subsequently, the stirring was continued for 3 hours at this temperature. After it was allowed to cool down to near room temperature, 200 ml of hexane was added and then 63.5 g of ethylaluminum sesquichloride was dropwise added over a period of 3 hours with stirring. After the addition was completed, the resulting mixture was raised to 50° C. with stirring. Subsequently, the stirring was continued for 2 hours at this temperature. The mixture thus-treated was allowed to cool down to near room temperature. The resulting reaction product was decanted and dried in the same manner as described for the purification of the Solid Catalyst Component (1-A). Thus, a solid product (hereinafter referred to as "Solid Ingredient (3-2)") was obtained.

After a portion (3.0 g) of the Solid Ingredient (3-2) was placed in the same 500 ml flask as described above previously, 100 ml of toluene was added thereto. The resulting mixture was fully stirred so as to provide a uniform suspension, and then 0.3 g of polypropylene glycol (molecular weight: 1,000; diol type) and 10.0 g of tetrahydrofuran were added thereto. The mixture thus-formed was fully stirred at 60° C. for 2 hours. The resulting reaction product was decanted and dried in the same manner as described for the purification of the Solid Catalyst Component (1-A). Thus, a solid product (hereinafter referred to as Solid Catalyst Component (3-B)") was obtained.

(3) A mixture of 20.0 g of the same anhydrous magnesium chloride as used in (1) and 5.0 g of titanium tetrachloride was copulverized for 8 hours under the same conditions as in (1) to provide a uniform copulverized product (titanium atom content: 5.2% by weight; magnesium atom content: 20.4% by weight; chlorine atom content: 74.7% by weight; hereinafter referred to as "Solid Ingredient (3-3)").

After a portion (3.0 g) of Solid Ingredient (3-3) was placed in the same 500 ml flask as described hereinabove, 200 ml of hexane and 3.0 g of polyethylene glycol (molecular weight: 800; diol type) were added, and the resulting mixture was stirred at room temperature for 1 hour. The resulting reaction product was decanted and dried in the same manner as described for the purification of the Solid Catalyst Component (1-A). To the thus-treated product were added 100 ml of toluene and furthermore 50 ml of pyridine and 3.2 ml of a 1 mole/l n-heptane solution of triethylaluminum. The resulting mixture was fully stirred at room temperature for 2 hours. The resulting reaction product was decanted and dried in the same manner as described for the purification of the Solid Catalyst Component (1-A). Thus, a solid product (hereinafter referred to as "Solid Catalyst Component (3-C)") was obtained.

(4) In a 500 ml flask were placed 10.0 g of magnesium ethylate and 30.0 g of tetrabutoxy zirconium. Additionally, 100 ml of isoparaffin was added, and the resulting mixture was fully stirred at 90° C. for 2 hours. After the mixture was allowed to cool down to room temperature, 100 ml of n-hexane was added and additionally 170 ml of a 70% by weight n-hexane solution of ethylaluminum dichloride was dropwise added at 40° C. over a period of 2 hours with stirring and then the stirring was continued at this temperature for 2 hours. The resulting reaction product was decanted and dried in the same manner as described for the purification of the Solid Catalyst Component (1-A). Thus, a solid product (hereinafter referred to as "Solid Ingredient (3-5)") was obtained.

After a portion (5.0 g) of Solid Ingredient (3-5) was placed in the same 500 ml flask as described previously, 150 ml of toluene was added thereto. Additionally, 0.5 g of polyisobutylene glycol (molecular weight: 3,000; diol type) and 30 ml of tetrahydrofuran were added, and the resulting mixture was fully stirred at room temperature for 2 hours. The resulting reaction product was decanted and dried in the same manner as described for the purification of the Solid Catalyst Component (1-A). Thus, a solid product (hereinafter referred to as "Solid Catalyst Component (3-D)") was obtained.

(II) Copolymerization of Ethylene with α-Olefin

In the same manner as in copolymerization in Examples 1 to 8 except that each of the solid catalyst components shown in Table 5-1 was used in the amount shown in Table 5-1 in place of the solid catalyst component or solid ingredient used in Examples 1 to 8, that each of the α-olefin shown in Table 5-1 was used as a comonomer, and that the hydrogen partial pressure was as shown in Table 5-1, ethylene and α-olefin were copolymerized for 2 hours. After the termination of the copolymerization, the ethylene-α-olefin copolymer thus-formed was dried in the same manner as in Examples 1 to 8. The yield of the copolymer thus-formed and the polymerization activity are shown in Table 5-1. Furthermore, M.I., calculated HLMI/M.I., net density, average particle diameter and proportion of fine powder having a diameter of 100 microns or less are shown in Table 5-2.

TABLE 5-1

| No. | Solid Catalyst Component or Solid Ingredient Kind | Amount (mg) | Hydrogen*1 Partial Pressure | α-Olefin Kind | Amount (g) | Yield (g) | Polymerization*2 Activity |
|---|---|---|---|---|---|---|---|
| Example 21 | Solid Catalyst Component (3-A) | 38 | 1.5 | Butene-1 | 60 | 212 | 800 |
| Example 22 | Solid Catalyst Component (3-B) | 45 | 1.0 | Hexene-1 | 40 | 221 | 700 |
| Example 23 | Solid Catalyst Component (3-C) | 15 | 1.0 | Butene-1 | 55 | 239 | 2,280 |
| Example 24 | Solid Catalyst (Component (3-D) | 41 | 7.0 | Propylene | 7 | 206 | 720 |

*1 kg/cm² (gauge pressure)
*2 g/g (= solid catalyst component) · time · ethylene partial pressure (kg/cm²)

TABLE 5-2

| No. | M.I. (g/10 min.) | HLMI/M.I. | Net Density (g/cc) | Average Particle Diameter (μ) | Proportion of Fine Powder (%) |
|---|---|---|---|---|---|
| Example 21 | 8.0 | 24.8 | 0.920 | 410 | 0.1 or less |
| Example 22 | 4.1 | 25.7 | 0.941 | 415 | 2.0 |
| Example 23 | 3.0 | 24.6 | 0.922 | 410 | 2.0 |
| Example 24 | 0.2 | 52.0 | 0.949 | 370 | 0.8 |

From the results shown in Table 5-2, it can be seen that the ethylene-α-olefin copolymer prepared by the use of the catalyst system comprising the solid catalyst component, organoaluminum compound or electron donor compound in combination are greatly improved in the distribution of particle diameter, and that the proportion of fine powder having a diameter of 100 microns or less is markedly reduced.

Examples 25 to 30

(1) After 3.0 g of the Solid Ingredient (1-6) was placed into the same 500 ml flask as described previously, further 0.3 g of propylene oxide and 100 ml of n-hexane were added with stirring. Subsequently, the resulting mixture was stirred at room temperature for 1 hour. The supernatant liquid of the reaction mixture was removed, and 100 ml of toluene was added to the residue (resulting reaction mixture). Thereafter, 5.4 g of tetrahydrofuran was added with stirring, and the resulting mixture was reacted at 60° C. for 2 hours. After lowering the temperature of the reaction mixture to room temperature, the reaction product thus-formed was washed with hexane and dried.

The resulting reaction product was decanted and dried in the same manner as described for the purification of the Solid Ingredient (1-1). Thus, a solid product (hereinafter referred to as "Solid Catalyst Component (4-A)") was obtained.

(2) 30 g of anhydrous magnesium chloride, 10.0 g of AA-type TiCl$_3$ and 10.0 g of tetracresyl silicate were copulverized in the same manner as the production of Solid Ingredient (1-1). After 3.0 g of the thus-obtained copulverized product was placed into the same 500 ml flask as described previously, 100 ml of n-heptan, and 0.71 g of 3-glydoxypropyltrimethoxysilane were added. Subsequently, the reaction mixture was fully stirred at room temperature for 1 hour so as to provide a uniform suspension. After the supernatant liquid of the suspension (reaction mixture) was removed, 100 ml of toluene was added to the residue. Thereafter, 10.8 g of tetrahydrofuran was added, and the resulting mixture was reacted at 60° C. for 2 hours. After lowering the temperature of the reaction mixture to room temperature, the resulting reaction product was decanted and dried in the same manner as described for the purification of the Solid Ingredient (1-1). Thus, a solid product (hereinafter referred to as "Solid Catalyst Component (4-B)") was obtained.

(3) 30.0 g of anhydrous magnesium chloride, 10.0 g of TiCl$_4$ and 10.0 g of triphenylphosphoric acid were copulverized in the same manner as the production of the Solid Ingredient (1-1). After 3.0 g of the thus-obtained copulverized product was placed into the same 500 ml flask as described previously, 100 ml of n-hexane and 1.2 g of glycidyl phenyl ether were added. Subsequently, the reaction mixture was fully stirred at room temperature for 1 hour so as to provide a uniform suspension. After supernatant liquid of the suspension (reaction mixture) was removed, 100 ml of toluene was added to the residue. After the addition of 11.7 g of pyridine, 3.0 ml of a 1 mole/l heptane solution of triethylaluminum was added, and the resulting mixture was reacted at 60° C. for 2 hours. The resulting reaction product was decanted and dried in the same manner as described for the purification of the Solid Ingredient (1-1). Thus, a solid product (hereinafter referred to as "Solid Catalyst Component (4-C)") was obtained.

(4) 30.0 g of anhydrous magnesium chloride, 10.0 g of TiCl$_4$ and 10.0 g of durene were copulverized in the same manner as the production of the Solid Ingredient (1-1). After 3.0 g of the thus-obtained copulverized product was placed into the same 500 ml flask, as described previously, 100 ml of n-hexane and 30 ml of a 1 mole/l heptane solution of triethylaluminum were added. Thereafter, 1.42 g of 3-glydoxypropyltrimethoxysilane was added thereto, and the resulting mixture was reacted at room temperature for 1 hour. The supernatant liquid of the reaction mixture was removed, and 100 ml of toluene was added to the residue. After the addition of 4.8 g of pyridine, the resulting mixture was reacted at 60° C. for 2 hours with stirring. The reaction mixture was lowered to room temperature. The resulting reaction product was decanted and dried in the same manner as described for the purification of the Solid Ingredient (1-1). Thus, a solid product (hereinafter referred to as "Solid Catalyst Component (4-D)") was obtained.

(5) After 3.0 g of the Solid Ingredient (2-F) was placed into the same 500 ml flask as described previously, 100 ml of n-hexane and 0.3 g of polypropylene glycol (molecular weight: 1,000; diol type) were added. Subsequently, the resulting mixture was stirred at room temperature for 1 hour with stirring, further the stirring was continued at this temperature, for 1 hour. The resulting reaction product was decanted and dried in the same manner as described for the purification of the Solid Ingredient (1-1). Thus, a solid product (hereinafter referred to as "Solid Catalyst Component (4-E)") was obtained.

(6) A mixture of 40 g of the same anhydrous magnesium chloride as used in (1) of Examples 1 to 8 and 20 g of AA-type titanium trichloride (produced by Toyo Stofa Co., Ltd.) was copulverized under the same conditions as in (1) of Examples 1 to 8 for 8 hours to prepare a copulverized product.

Of the solid ingredient thus obtained, a 3.0 g portion was placed in a 500 ml flask, and 200 ml of n-hexane was added and stirred to provide a uniform suspension. To the suspension thus-formed was added 0.3 g of polypropylene glycol (molecular weight: 2,000; diol type), and the resulting mixture was fully stirred at room temperature for 1 hour. Thereafter, it was allowed to stand, and the supernatant liquid was removed and 100 ml of toluene was added thereto. Then, 5.0 g of tetrahydrofuran was added, and the resulting mixture was fully stirred at 60° C. for 2 hours. The mixture was then allowed to cool down to room temperature, and washing and drying were performed in the same manner as in (1) as described above. Thus, a powdery Solid Catalyst Component (4-F) was obtained.

Using the resulting Solid Catalyst Components (4-A) to (4-F), ethylene with butene-1 were copolymerized in the same manner as in Example 21. The polymerization conditions and results obtained are shown in Table 6.

TABLE 6

| Ex. No. | Main Catalyst Kind | Main Catalyst Amount (mg) | Hydrogen*1 Partial Pressure | α-Olefin Kind | α-Olefin Amount (g) | Net Density (g/cm$^3$) | Polymerization*2 Activity | M.I. (g/10 min) | HLMI/ M.I. | Average Particle Diameter (μ) | Fine*3 Powder (wt %) |
|---|---|---|---|---|---|---|---|---|---|---|---|
| 25 | Solid Catalyst Component (4-A) | 28 | 1.5 | Butene-1 | 60 | 0.921 | 1,080 | 2.8 | 24.5 | 400 | 0.1 or |
| 26 | Solid Catalyst Component (4-B) | 35 | 1.5 | Butene-1 | 60 | 0.920 | 970 | 3.1 | 25.1 | 410 | 0.1 or less |
| 27 | Solid | 31 | 1.5 | Hexene-1 | 70 | 0.932 | 880 | 1.6 | 26.2 | 380 | 0.1 or |

TABLE 6-continued

| Ex. No. | Main Catalyst Kind | Main Catalyst Amount (mg) | Hydrogen*[1] Partial Pressure | α-Olefin Kind | α-Olefin Amount (g) | Net Density (g/cm³) | Polymerization*[2] Activity | M.I. (g/10 min) | HLMI/ M.I. | Average Particle Diameter (μ) | Fine*[3] Powder (wt %) |
|---|---|---|---|---|---|---|---|---|---|---|---|
| 28 | Catalyst Component (4-C) Solid Catalyst Component (4-D) | 22 | 1.5 | Hexene-1 | 70 | 0.933 | 1,420 | 2.2 | 25.1 | 410 | less 0.1 or less |
| 29 | Solid Catalyst Component (4-E) | 14 | 1.5 | Butene-1 | 40 | 0.934 | 2,680 | 3.1 | 24.2 | 400 | 0.1 or less |
| 30 | Solid Catalyst Component (4-F) | 23 | 1.5 | Hexene-1 | 85 | 0.928 | 1,330 | 2.5 | 26.0 | 400 | 0.1 or less |

*[1]kg/cm² (gauge pressure)
*[2]g/g (= solid catalyst component) · time · ethylene partial pressure (kg/cm²)
*[3]The amount of the fine powder having 100μμ or less of the particle diameter.

Example 31

Using 80.0 mg of the Solid Catalyst Component (1-G) and 0.54 g of triethylaluminum, homopolymerization was carried out in liquid propylene at 80° C. for 1 hour. No polymer was obtained.

From the results shown in the foregoing examples, it can be seen that the ethylene-α-olefin copolymer prepared by the use of the catalyst system comprising the solid catalyst component, organoaluminum compound or the electron donor compound in combination is markedly improved in the distribution of particle diameters, the amount of fine powder having a diameter of 100 microns or less is greatly reduced. Furthermore, the molecular weight distribution of the copolymer is narrow and the amount of the soluble portion of the copolymer is little.

While the invention has been described in detail and with reference to specific embodiments thereof, it will be apparent to one skilled in the art that various changes and modifications can be made therein without departing from the spirit and scope thereof.

What is claimed is:

1. A process for producing ethylenic polymers which comprises homopolymerizing ethylene or copolymerizing ethylene with an α-olefin containing 3 to 12 carbon atoms by the use of a catalyst system comprising:
(A) a solid catalyst component prepared by treating
  (1) a solid ingredient containing 0.1 to 50% by weight of a magnesium atom, 0.01 to 30% by weight of titanium element, and at most 90% by weight of at least one halogen atom selected from the group consisting of a chlorine atom and a bromine atom, with
  (2) a 4- to 8-membered cyclic organic compound having a total number of oxygen and nitrogen atoms in the cyclic group of said cyclic organic compound of from 1 to 3 and having a total number of carbon atoms in the substituent of at most 32, said cyclic organic compound being used in the amount of 10 to 10,000 moles per gram equivalent of the titanium element of the solid ingredient; and
(B) an organoaluminum compound, wherein said ethylenic polymer contains 30 mole % or less of said α-olefin, and said magnesium in said solid ingredient is derived from a magnesium compound selected from the group consisting of compounds represented by Formulae (I) and (II):

wherein $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms when m is 0 or 1 and n is 1 or 2, respectively, and when m is 2, $R^1$ and $R^2$ are each a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$, and $X^2$ are each a halogen atom.

2. A process for producing ethylenic polymers which comprises homopolymerizing ethylene or copolymerizing ethylene with an α-olefin containing 3 to 12 carbon atoms by the use of a catalyst system comprising:
(A) a solid catalyst component prepared by treating
  (1) a solid ingredient containing 0.1 to 50% by weight of a magnesium atom, 0.01 to 30% by weight of titanium element, and at most 90% by weight of at least one halogen atom selected from the group consisting of a chlorine atom and a bromine atom, with
  (2) a 4- to 8-membered cyclic organic compound having a total number of oxygen and nitrogen atoms in the cyclic group of said cyclic organic compound of from 1 to 3 and having a total number of carbon atoms in the substituent of at most 32, said cyclic organic compound being used in the amount of 10 to 10,000 moles per gram equivalent of the titanium element of the solid ingredient; in the presence of
  (3) at least one compound selected from the group consisting of an alkyl metal compound of Group Ia, IIa, IIb or IIIa and containing 1 to 15 carbon atoms in the alkyl portion, a polyether compound having a molecular weight of 400 to 10,000, and an alkylene oxide compound capable of providing the polyether compound by ring-open polymerization in the course of the production of the solid catalyst component, and (B) an organoaluminum compound, wherein said cyclic organic compound is used in an amount of 10 to 10,000 moles per gram equivalent of the titanium element of said solid ingredient, and the total amount of said alkyl metal compound, the polyether compound and the alkylene oxide compound is at most 200 parts by weight per part by weight of the solid ingredient, and wherein said ethylenic polymer contains 30 mole % or less of said α-olefin, and said magnesium in said solid ingredient is derived from a magnesium compound selected from the group consisting of compounds represented by Formulae (I) and (II):

$$Mg(OR^1)_m X^1{}_{2-m} \qquad (I)$$

$$MgR^2{}_n X^2{}_{2-n} \qquad (II)$$

wherein $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms when m is 0 or 1 and n is 1 or 2, respectively, and when m is 2, $R^1$ and $R^2$ are each a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$, and $X^2$ are each a halogen atom.

3. A process for producing ethylenic polymers which comprises homopolymerizing ethylene or copolymerizing ethylene with an α-olefin containing 3 to 13 carbon atoms by the use of a catalyst system comprising:

(A) a solid catalyst component prepared by treating
 (1) a product which is obtained by treating previously
  (a) a solid ingredient containing 0.1 to 50% by weight of a magnesium atom, 0.01 to 30% by weight of titanium element, and at most 90% by weight of at least one halogen atom selected from the group consisting of a chlorine atom and a bromine atom, with
  (b) a 4- to 8-member cyclic organic compound having a total number of oxygen and nitrogen atoms in the cyclic group of said cyclic organic compound of from 1 to 3 and having a total number of carbon atoms in the substituent of at most 32, said cyclic organic compound being used in the amount of 10 to 10,000 moles per gram equivalent of the titanium element of the solid ingredient; with
 (2) at least one compound selected from the group consisting of at least one alkyl metal compound of Group Ia, IIa, IIb or IIIa and containing 1 to 15 carbon atoms in the alkyl portion, a polyether compound having a molecular weight of 400 to 10,000, and an alkylene oxide compound capable of providing the polyether compound by ring-open polymerization in the course of the production of the solid catalyst component, and (B) an organoaluminum compound, wherein said cyclic organic compound is used in an amount of 10 to 10,000 moles per gram equivalent of the titanium element of said solid ingredient, and the total amount of said alkyl metal compound, the polyether compound and the alkylene oxide compound is at most 200 parts by weight per part by weight of the solid ingredient, and wherein said ethylenic polymer contains 30 mole % or less of said α-olefin, and said magnesium in said solid ingredient is derived from a magnesium compound selected from the group consisting of compounds represented by Formulae (I) and (II):

$$Mg(OR^1)_m X^1{}_{2-m} \qquad (I)$$

$$MgR^2{}_n X^2{}_{2-n} \qquad (II)$$

wherein $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms when m is 0 or 1 and n is 1 or 2, respectively, and when m is 2, $R^1$ and $R^2$ are each a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$, and $X^2$ are each a halogen atom.

4. A process for producing ethylenic polymers which comprises homopolymerizing ethylene or copolymerizing ethylene with an α-olefin containing 3 to 12 carbon atoms by the use of a catalyst system comprising:

(A) a solid catalyst component prepared by treating
 (1) a product which is obtained by treating previously
  (a) a solid ingredient containing 0.1 to 50% by weight of a magnesium atom, 0.01 to 30% by weight of titanium element and at most 90% by weight of at least one halogen atom selected from the group consisting of a chlorine atom and a bromine atom, with
  (b) at least one compound selected from the group consisting of at least one alkyl metal compound of Group Ia, IIa, IIb or IIIa and containing 1 to 15 carbon atoms in the alkyl portion, a polyether compound having a molecular weight of 400 to 10,000, and an alkylene oxide compound capable of providing the polyether compound by ring-open polymerization in the course of the production of the solid catalyst component, with
 (2) a 4- to 8-membered cyclic organic compound having a total number of oxygen and nitrogen atoms in the cyclic group in the cyclic organic compound of from 1 to 3 and having a total number of carbon atoms in the substituent of at most 32, said cyclic organic compound being used in the amount of 10 to 10,000 moles per gram equivalent of the titanium element of the solid ingredient; and (B) an organoaluminum compound, wherein said cyclic organic compound is used in an amount of 10 to 10,000 moles per gram equivalent of the titanium element of said solid ingredient, and the total amount of said alkyl metal compound, the polyether compound and the alkylene oxide compound is at most 200 parts by weight per part by weight of the solid ingredient, and wherein said ethylenic polymer contains 30 mole % or less of said α-olefin, and said magnesium in said solid ingredient is derived from a magnesium compound selected from the group consisting of compounds represented by Formulae (I) and (II):

$$Mg(OR^1)_m X^1_{2-m} \qquad (I)$$

$$MgR^2_n X^2_{2-n} \qquad (II)$$

wherein $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms when m is 0 or 1 and n is 1 or 2, respectively, and when m is 2, $R^1$ and $R^2$ are each a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$, and $X^2$ are each a halogen atom.

5. The process as claimed in claim 1, wherein the solid ingredient is prepared by treating at least one magnesium compound selected from the group consisting of compounds represented by the Formulae (I) and (II):

$$Mg(OR^1)_m X^1_{2-m} \qquad (I)$$

$$MgR^2_n X^2_{2-n} \qquad (II)$$

wherein m is 0, 1 or 2, n is 1 or 2, $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$ and $X^2$ are each a halogen atom, with at least one titanium compound selected from the group consisting of titanium trichloride, an eutectic product of titanium trichloride and aluminum trichloride, and a compound represented by the Formula (III):

$$Ti(OR^3)_l X^3_{4-l} \qquad (III)$$

wherein l is 0, 1 to 4, $R^3$ contains at most 12 carbon atoms and is selected from the group consisting of an aliphatic hydrocarbon group, an alicyclic hydrocarbon group and an aromatic hydrocarbon group, and $X^3$ is a chlorine or bromine atom, and the ratio of the titanium element per mole of the magnesium compound is from 0.02 to 20 moles.

6. The process as claimed in claim 2, wherein the solid ingredient is prepared by treating at least one magnesium compound selected from the group consisting of compounds represented by the Formulae (I) and (II):

$$Mg(OR^1)_m X^1_{2-m} \qquad (I)$$

$$MgR^2_n X^2_{2-n} \qquad (II)$$

wherein m is 0, 1 or 2, n is 1 or 2, $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$ and $X^2$ are each a halogen atom, with at least one titanium compound selected from the group consisting of titanium trichloride, an eutectic product of titanium trichloride and aluminum trichloride, and a compound represented by the Formula (III):

$$Ti(OR^3)_l X^3_{4-l} \qquad (III)$$

wherein l is 0, or 1 to 4, $R^3$ contains at most 12 carbon atoms and is selected from the group consisting of an aliphatic hydrocarbon group, an alicyclic hydrocarbon group and an aromatic hydrocarbon group, and $X^3$ is a chlorine or bromine atom, and the ratio of the titanium element per mole of the magnesium compound is from 0.02 to 20 moles.

7. The process as claimed in claim 3, wherein the solid ingredient is prepared by treating at least one magnesium compound selected from the group consisting of compounds represented by the Formulae (I) and (II):

$$Mg(OR^1)_m X^1_{2-m} \qquad (I)$$

$$MgR^2_n X^2_{2-n} \qquad (II)$$

wherein m is 0, 1 or 2, n is 1 or 2, $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$ and $X^2$ are each a halogen atom with at least one titanium compound selected from the group consisting of titanium trichloride, an eutectic product of titanium trichloride and aluminum trichloride, and a compound represented by the formula (III):

$$Ti(OR^3)_l X^3_{4-l} \qquad (III)$$

wherein l is 0, or 1 to 4, $R^3$ contains at most 12 carbon atoms and is selected from the group consisting of an aliphatic hydrocarbon group, an alicyclic hydrocarbon group and an aromatic hydrocarbon group, and $X^3$ is a chlorine or bromine atom and the ratio of the titanium element per mole of the magnesium compound is from 0.02 to 20 moles.

8. The process as claimed in claim 4, wherein the solid ingredient is prepared by treating at least one magnesium compound selected from the group consisting of compounds represented by the Formulae (I) and (II):

$$Mg(OR^1)_m X^1_{2-m} \qquad (I)$$

$$MgR^2_n X^2_{2-n} \qquad (II)$$

wherein m is 0, 1 or 2, n is 1 or 2, $R^1$ and $R^2$ are each a hydrogen atom or a hydrocarbon group selected from the group consisting of an aliphatic hydrocarbon group containing 1 to 16 carbon atoms, an alicyclic hydrocarbon group containing 3 to 16 carbon atoms, and an aromatic hydrocarbon group containing 6 to 16 carbon atoms, and $X^1$ and $X^2$ are each a halogen atom with at least one titanium compound selected from the group consisting of titanium trichloride, an eutectic product of titanium trichloride and aluminum trichloride, a compound represented by the Formula (III):

$$Ti(OR^3)_l X^3_{4-l} \qquad (III)$$

wherein l is 0, or 1 to 4, $R^3$ contains at most 12 carbon atoms and is selected from the group consisting of an aliphatic hydrocarbon group, an alicyclic hydrocarbon group and an aromatic hydrocarbon group, and $X^3$ is a chlorine or bromine atom and the ratio of the titanium element per mole of the magnesium compound is from 0.02 to 20 moles.

9. The process as claimed in claim 6, wherein said solid catalyst component is prepared by treating said solid ingredient, and
an alkyl aluminum compound represented by the Formula (IV):

$$R^4{}_a Al(OR^5)_b H_c X^4{}_d \qquad (IV)$$

wherein $R^4$ is an alkyl group containing at most 15 carbon atoms, $R^5$ is an aliphatic or aromatic hydrocarbon containing at most 15 carbon atoms, $X^4$ is a halogen atom, $0 < a \leq 3$, $0 \leq b < 3$, $0 \leq c < 3$, $0 \leq d < 3$, and $a+b+c+d=3$,
wherein the ratio of said titanium element to 1 mole of the magnesium compound is 0.02 to 20 moles, and the ratio of said alkyl aluminum compound to 1 mole of the magnesium compound is at most 10 moles.

10. The process as claimed in claims 2, 3 or 4, wherein the polyether compound is a compound represented by the Formula (VI), (VII) or (VIII):

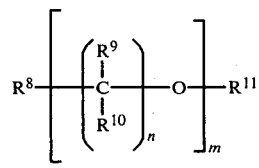

(VI)

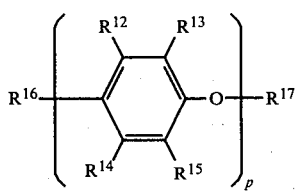

(VII)

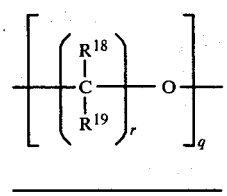

(VIII)

wherein $R^8$, $R^9$, $R^{10}$ and $R^{11}$, $R^{12}$, $R^{13}$, $R^{14}$, $R^{15}$, $R^{16}$ and $R^{17}$, or $R^{18}$ and $R^{19}$ are the same or different, $R^8$, $R^9$, $R^{10}$ and $R^{11}$ are each a hydrogen atom, or a hydrocarbon group containing at most 8 carbon atoms, $R^{12}$, $R^{13}$, $R^{14}$, $R^{15}$, $R^{16}$ and $R^{17}$ are each a hydrogen atom or a hydrocarbon group containing at most 8 carbon atoms, $R^{18}$ and $R^{19}$ are each a hydrogen atom or a hydrocarbon group containing at most 8 carbon atoms, further $R^8$ and $R^{16}$ may be each a hydroxy group, furthermore $R^9$ and $R^{10}$ may be each a hydroxy group or an ether group, an ester group or a silyl group having at most 24 carbon and/or silicon atoms, m is a number of 7 to 30, n is a number of 1 to 6, p is a number of 7 to 100, q is a number of at least 6, r is a number of 1 to 6, and n and r are the same or different in the molecule.

11. The process as claimed in claims 1, 2, 3 or 4 wherein the organoaluminum compound is selected from those represented by Formulae (IX), (X), and (XI):

$$AlR^{20}R^{21}R^{22} \qquad (IX)$$

$$R^{23}R^{24}Al\text{-}O\text{-}AlR^{25}R^{26} \qquad (X)$$

$$AlR^{27}{}_{1.5}X^6{}_{1.5} \qquad (XI)$$

wherein $R^{20}$, $R^{21}$ and $R^{22}$ are the same or different and are each an aliphatic, alicyclic or aromatic hydrocarbon group containing at most 12 carbon atoms, a halogen atom or a hydrogen atom, at least one of $R^{20}$, $R^{21}$ and $R^{22}$ is a hydrocarbon group, $R^{23}$, $R^{24}$, $R^{25}$ and $R^{26}$ are the same or different and are each the same hydrocarbon as described above for $R^{20}$, $R^{21}$ and $R^{22}$, $R^{27}$ is the same hydrocarbon group as described above for $R^{20}$, $R^{21}$ and $R^{22}$, and $X^6$ is a halogen atom.

12. The process as claimed in claim 2, 3 or 4 wherein the alkylene oxide compound is ethylene oxide, propylene oxide, glycidyl methacrylate, glycidyl phenyl ether, or 3-glycidoxypropyltrimethoxysilane.

13. The process as claimed in claims 1, 2, 3 or 4 wherein the amount of the organoaluminum compound used is 1 to 1,000 moles per 1 atom equivalent of the titanium element contained in the solid catalyst component.

14. The process as claimed in claims 1, 2, 3 or 4 wherein the solid catalyst is further treated with at least one compound selected from the group consisting of the alkyl metal compound, the polyether compound and the alkylene oxide compound.

15. The process as claimed in claims 1, 2, 3 or 4 wherein said magnesium compound is selected from the group consisting of $MgCl_2$, $MgBr_2$, $Mg(OC_2H_5)_2$, $Mg(OC_4H_9)_2$, $Mg(OH)Cl$, $MgC_2H_5 \cdot C_4H_9$, $Mg(C_4H_9)_2$, $Mg(C_2H_5)Cl$, $Mg(C_4H_9)Cl$, $Mg(C_6H_5)Cl$, $Mg(C_2H_5)Br$, $Mg(C_4H_9)Br$ and $Mg(C_6H_5)Br$.

16. The process as claimed in claims 1, 2, 3 or 4 wherein said ethylenic polymers have a density of 0.900 to 0.935 g/cc.

* * * * *